(12) United States Patent
Bando

(10) Patent No.: US 7,735,339 B2
(45) Date of Patent: Jun. 15, 2010

(54) METHOD OF AND APPARATUS FOR WORKING A GLASS PLATE

(75) Inventor: Shigeru Bando, Tokushima (JP)

(73) Assignee: Bando Kiko Co., Ltd., Tokushima (JP)

( * ) Notice: Subject to any disclaimer, the term of this patent is extended or adjusted under 35 U.S.C. 154(b) by 440 days.

(21) Appl. No.: 10/852,128

(22) Filed: May 25, 2004

(65) Prior Publication Data

US 2004/0211219 A1  Oct. 28, 2004

Related U.S. Application Data

(63) Continuation of application No. 09/874,398, filed on Jun. 6, 2001, now abandoned.

(30) Foreign Application Priority Data

Jun. 15, 2000 (JP) ............................. 2000-180500

(51) Int. Cl.
*C03B 23/00* (2006.01)
*C03B 23/023* (2006.01)
(52) U.S. Cl. ..................... 65/64; 65/106; 65/182.1; 65/290
(58) Field of Classification Search ............... 65/62–64, 65/25.2, 90, 93, 96, 97, 100, 102, 106, 118, 65/182.1, 275, 285, 287, 289–291
See application file for complete search history.

(56) References Cited

U.S. PATENT DOCUMENTS

| | | | | |
|---|---|---|---|---|
| 3,778,244 A | * | 12/1973 | Nedelec et al. ............... | 65/106 |
| 3,905,794 A | * | 9/1975 | Revells et al. ................. | 65/106 |
| RE29,097 E | * | 1/1977 | Bando ......................... | 451/260 |
| 4,300,935 A | | 11/1981 | Seymour | |
| 4,698,088 A | * | 10/1987 | Bando ......................... | 65/174 |
| 4,813,993 A | * | 3/1989 | Letemps et al. ............... | 65/273 |
| 4,865,638 A | * | 9/1989 | Kudo ......................... | 65/273 |
| 4,915,722 A | * | 4/1990 | Havenith et al. .............. | 65/106 |
| 5,172,949 A | * | 12/1992 | Nagai et al. ................. | 294/64.1 |
| 5,178,660 A | * | 1/1993 | Wampler et al. .............. | 65/273 |
| 5,393,316 A | * | 2/1995 | Sugiyama et al. ............. | 65/106 |
| 5,415,581 A | * | 5/1995 | Bando ......................... | 451/67 |
| 5,651,805 A | * | 7/1997 | Kuster et al. ................. | 65/273 |
| 5,713,976 A | * | 2/1998 | Kuster et al. ................. | 65/106 |
| 5,733,353 A | * | 3/1998 | Bando ......................... | 65/174 |
| 5,759,222 A | * | 6/1998 | Bando ......................... | 65/174 |
| 5,888,268 A | * | 3/1999 | Bando ......................... | 65/286 |
| 5,992,180 A | * | 11/1999 | Tsuchiya et al. .............. | 65/102 |
| 6,279,347 B1 | * | 8/2001 | Yoshizawa ................... | 65/102 |

(Continued)

FOREIGN PATENT DOCUMENTS

DE   1266230   4/1968

(Continued)

*Primary Examiner*—Carlos Lopez
(74) *Attorney, Agent, or Firm*—Nixon & Vanderhye P.C.

(57) ABSTRACT

An apparatus for working a glass plate includes: a transporting device for bending a glass plate in a concave shape in a cross-sectional view in a transporting direction and transporting the glass plate from a cutting section to a bend-breaking section; a cutting device for forming cut lines on the glass plate in the cutting section; and a bend-breaking device for bend-breaking the glass plate in the bend-breaking section.

11 Claims, 15 Drawing Sheets

U.S. PATENT DOCUMENTS 6,357,263 B1 * 3/2002 Yajima et al. ................. 65/102
6,363,753 B1 * 4/2002 Yoshizawa et al. ............ 65/287
6,422,040 B1 * 7/2002 McMaster et al. ............. 65/106

FOREIGN PATENT DOCUMENTS

| | | | |
|---|---|---|---|
| EP | 0550408 | | 7/1993 |
| JP | 02-107534 | * | 4/1990 |
| JP | 06305561 | | 11/1994 |
| JP | 10-182176 | * | 7/1998 |
| JP | 2000128344 | | 5/2000 |

* cited by examiner

METHOD OF AND APPARATUS FOR WORKING A GLASS PLATE

This application is a continuation of application Ser. No. 09/874,398, filed Jun, 6, 2001, now abandoned, the entire content of which is incorporated herein by reference.

BACKGROUND OF THE INVENTION

1. Field of the Invention

The present invention relates to a method of and an apparatus for working a glass plate which is used in an automobile, a general building, and the like.

2. Description of the Related Art

A conventional glass-plate working apparatus is so arranged that a glass plate is held by being sucked under a vacuum by a vacuum suction unit, the sucked glass plate is raised by an air cylinder unit, and the raised glass plate is moved in a transporting direction by a moving means, so as to carry in and out the glass plate to and from a working section.

However, in a case where the glass plate is transported by the above-described glass-plate working apparatus, since the area where the glass plate is sucked and held by the vacuum suction unit is a limited area, deflection can occur in the glass plate due to its own weight, so that there is a possibility that cracking occurs in the glass plate when, for example, the glass plate is raised or lowered.

SUMMARY OF THE INVENTION

The present invention has been devised in view of the above-described aspects, and its object is to provide a method of and an apparatus for working a glass plate in which deflection does not occur in the glass plate due to its own weight while the glass plate is being transported, and which does not cause cracking in the glass plate during, for instance, the raising or lowering of the glass plate.

To this end, in accordance with the present invention, there is provided a method of working a glass plate, comprising the steps of: bending a glass plate in a concave shape in a cross-sectional view in a transporting direction and transporting the glass plate from one section to another section; and working the glass plate in at least one of the one section and the other section.

According to the method of working a glass plate in accordance with the invention, since the glass plate is bent in a concave shape in a cross-sectional view in the transporting direction and is transported from one section to another section, the section modulus of the geometrical moment of inertia of the glass plate becomes large, so that the deflection of the glass plate due to its own weight ceases to occur during transport. Hence, cracking during, for example, the raising or lowering of the glass plate ceases to occur.

In the method of working a glass plate in accordance with the invention, the glass plate is preferably sucked and bent. By bending the glass plate by sucking it, it becomes possible to bend the glass plate with a desired curvature corresponding to the size and weight of the glass plate, and scars and the like are difficult to occur on the surface of the glass plate.

In the method of working a glass plate in accordance with the invention, the glass plate may preferably be bent in a downwardly convex shape, or bent in an upwardly convex shape. By bending the glass plate in a downwardly convex shape, there is no risk of interference, collision, or the like with a supporting device and other members located on the lower side of the glass plate during transport. On the other hand, by bending the glass plate in an upwardly convex shape, there is no risk of interference, collision, or the like with a frame and other members located on the upper side of the glass plate during transport.

One surface of the glass plate which is worked by the method of working a glass plate in accordance with the invention may be coated. When the glass plate is transported, if the glass plate is sucked and held from the other surface opposing the coated one surface (coated surface), no scars and the like are produced on the coated surface, so that this arrangement is preferable.

An apparatus for working a glass plate in accordance with the invention comprises: transporting means for bending a glass plate in a concave shape in a cross-sectional view in a transporting direction and transporting the glass plate from one section to another section; and a working section for working the glass plate in at least one of the one section and the other section.

According to the apparatus for working a glass prate in accordance with the invention, since the arrangement provided is such that the glass plate is bent in a concave shape in a cross-sectional view in the transporting direction and is transported from one section to another section by the transporting means, the section modulus of the geometrical moment of inertia of the glass plate becomes large, so that the deflection of the glass plate due to its own weight ceases to occur during transport. Hence, cracking during, for example, the raising or lowering of the glass plate ceases to occur.

The transporting means of the apparatus for working a glass plate in accordance with the invention is adapted to carry one glass plate from the one section into the other section and to carry out another glass plate from the other section synchronously with the carrying-in. Further, the transporting means is adapted to carry one glass plate into the one section and to carry out another glass plate from the one section to the other section synchronously with the carrying-in. Since the transporting means is adapted to carry one glass plate from the one section into the other section and to carry out another glass plate from the other section synchronously with the carrying-in, and is adapted to carry one glass plate into the one section and to carry out another glass plate from the one section to the other section synchronously with the carrying-in, it is possible to reduce the time required for the carrying in and carrying out of the glass plates.

The transporting means of the apparatus for working a glass plate in accordance with the invention may preferably be adapted to bend the glass plate in a downwardly convex shape, or to bend the glass plate in an upwardly convex shape. Since the glass plate is arranged to be bent in a downwardly convex shape, there is no risk of interference, collision, or the like with a supporting device and other members located on the lower side of the glass plate during transport. On the other hand, since the glass plate is arranged to be bent in an upwardly convex shape, there is no risk of interference, collision, or the like with a frame and other members located on the upper side of the glass plate during transport.

The transporting means of the apparatus for working a glass plate in accordance with the invention may preferably have suction means for sucking and bending the glass plate. Since the suction means is adapted to bend the glass plate by sucking it, it becomes possible to bend the glass plate with a desired curvature corresponding to the size and weight of the glass plate, and scars and the like are difficult to occur on the surface of the glass plate.

The suction means of the transporting means of the apparatus for working a glass plate in accordance with the invention may preferably have recessed portions formed by recessing portions of a holding surface which is concave or convex in the cross-sectional view in the transporting direction, so as to suck and hold the glass plate from one surface thereof or another surface opposing the one surface. Further, this holding surface may be formed in a V-shape in the cross-sectional view in the transporting direction.

The transporting means of the apparatus for working a glass plate in accordance with the invention may preferably have raising/lowering means for raising or lowering the glass plate. Since this raising/lowering means is adapted to raise or lower the glass plate, for example, the glass plate sucked by the suction means can be smoothly transported without interference with the supporting device or the like.

One surface of the glass plate which is worked by the apparatus for working a glass plate in accordance with the invention may be coated. When the glass plate is transported by the transporting means, if the glass plate is sucked and held from the other surface opposing the coated surface by the suction means, no scars or the like are produced on the coated surface, so that this arrangement is preferable. It should be noted that a film layer for shielding heat rays, ultraviolet rays, visible rays, or the like is formed by sputtering (metallic deposition) on the coated surface of the glass plate which is worked by the method of and the apparatus for working a glass plate in accordance with the invention.

The above and other objects, features and advantages of the present invention will become more apparent from the following detailed description of the invention when read in conjunction with the accompanying drawings.

DESCRIPTION OF THE PREFERRED EMBODIMENTS

Figure 1:
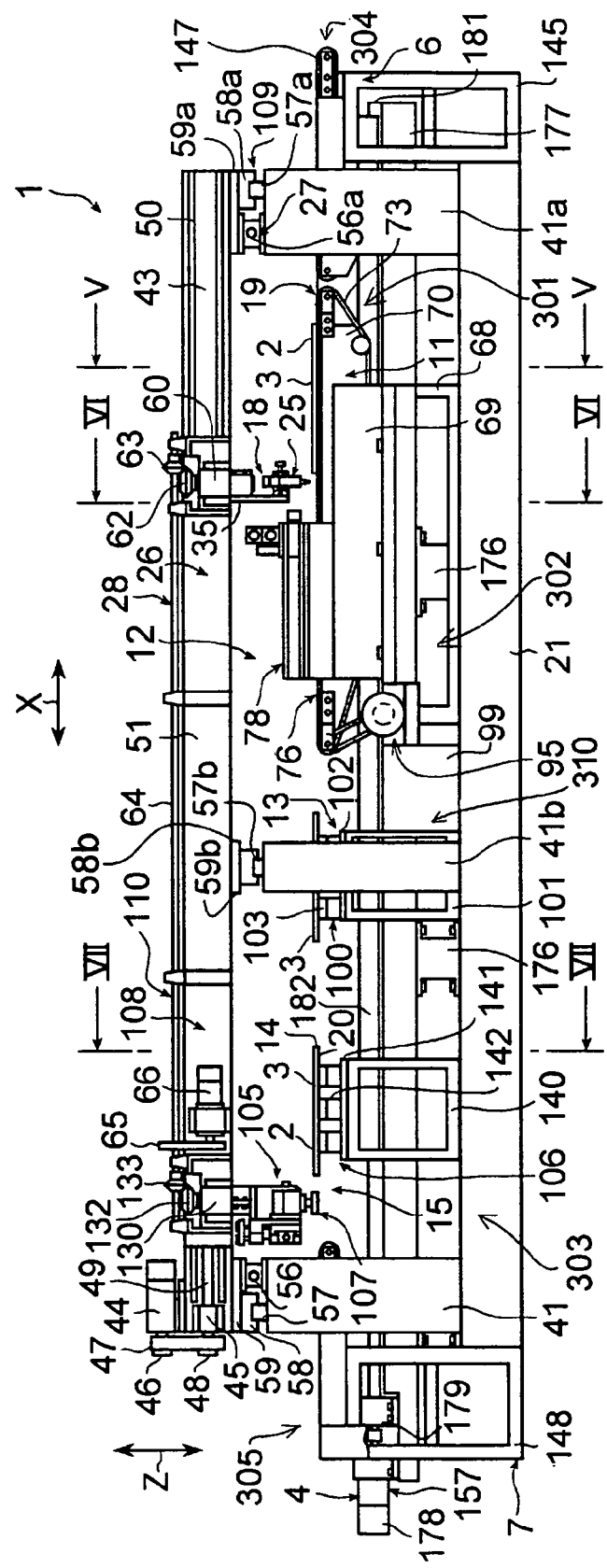
FIG. 1 is a front elevational view of an apparatus for working a glass plate in accordance with the invention.

Referring now to the accompanying drawings, a description will be given of a more detailed description of the preferred embodiments of the invention. It should be noted that the present invention is not limited to these embodiments.

In FIGS. 1 to 14, a glass-plate working apparatus 1 in accordance with an embodiment of the invention includes a transporting means 4 for transporting a glass plate 3 which is used as, for example, window glass for an automobile, particularly windshield and rear window glass, and has one surface 2 coated by sputtering. The transporting means 4 transports the glass plate 3 from a carrying-in section 6 to a cutting section 11 for forming cut lines 10 on the glass plate 3 after bending the glass plate 3 in a concave shape in a cross-sectional view in an X direction as a cross-sectional view in a transporting direction, transports the glass plate 3 with the cut lines 10 formed thereon from the cutting section 11 to a bend-breaking section 12 for bend-breaking it along the cut lines 10, transports the bend-broken glass plate 3 from the bend-breaking section 12 to a placing section 13 for placing it thereon, transports the bend-broken glass plate 3 from the placing section 13 to a grinding section 15 for grinding its peripheral edges 14, and transports the ground glass plate 3 from the grinding section 15 to a carrying-out section 7. The glass-plate working apparatus 1 further includes a cutting device 301 disposed in the cutting section 11 as a working unit for working the glass plate 3, a bend-breaking device 302 disposed in the bend-breaking section 12, and a grinding device 303 disposed in the grinding section 15.

It should be noted that the glass-plate working apparatus 1 may be constructed such that the placing section 13 is omitted, and the glass plate 3 transported from the bend-breaking section 12 by the transporting means 4 is transported directly to the grinding section 15.

A carrying-in-table device 304 disposed in the carrying-in section 6 includes a carrying-in table 145 disposed on the carrying-in side for carrying in the glass plate 3, and rollers (not shown) for positioning the glass plate 3 and a plurality of endless belts 147 for placing the glass plate 3 thereon are arranged on an upper surface of the carrying-in table 145.

The cutting device 301 disposed in the cutting section 11 includes a cutting means 18 for forming main cut lines 16 and edge cut lines 17 on the glass plate 3 as well as a pair of supporting devices 19 and 19a for supporting the glass plate 3 to be cut. The pair of supporting devices 19 and 19a are disposed on a base 21 in face-to-face relation to each other in such a manner as to sandwich the transporting means 4 in a Y direction which is perpendicular to the X direction and parallel to one surface 2 of the glass plate 3 and the other surface 20 opposite thereto.

Figure 8:
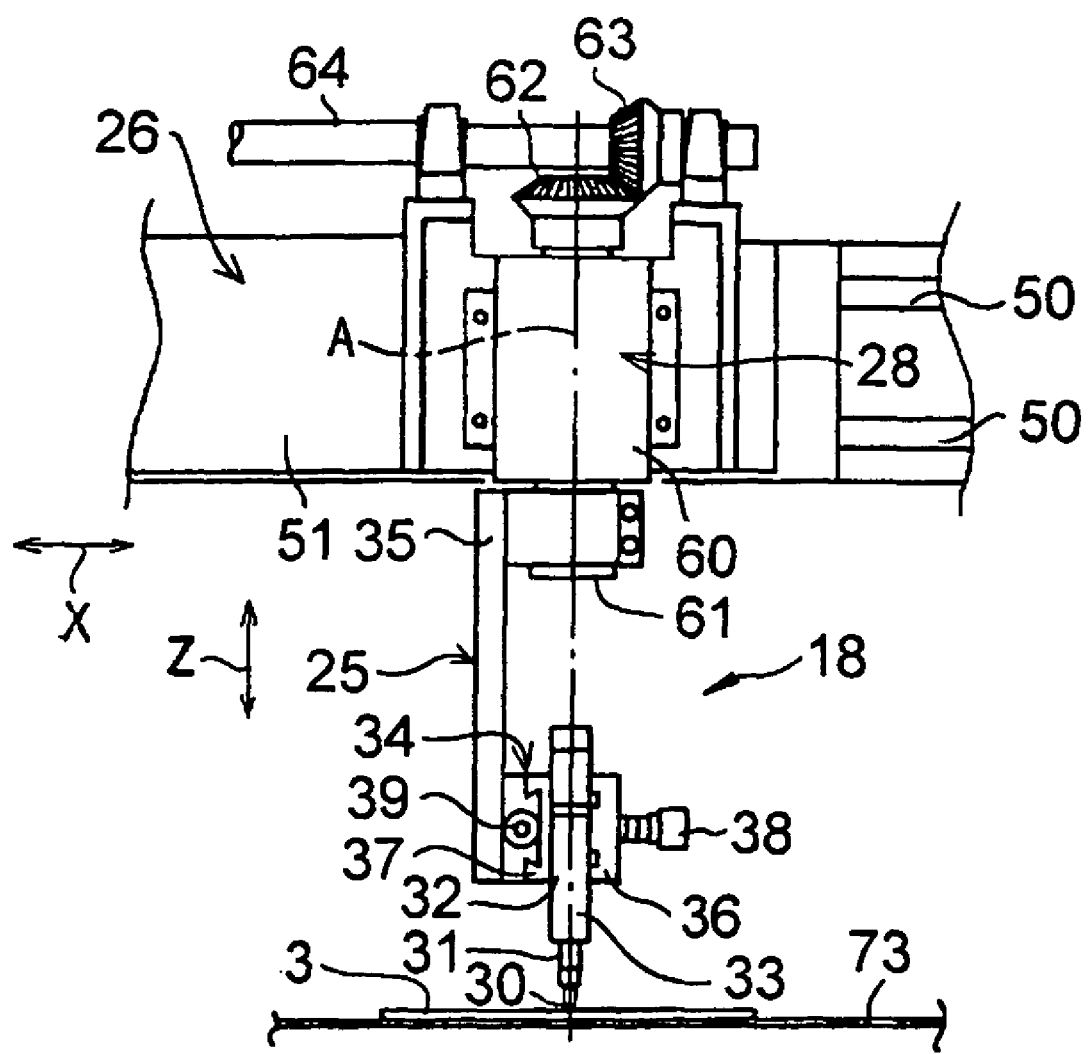
FIG. 8 is an enlarged explanatory view of mainly a cutting means of the embodiment shown in FIG. 1.

As shown in FIG. 8, the cutting means 18 includes a cutter head 25, an X-direction moving device 26 for moving the cutter head 25 in the X direction, a Y-direction moving device 27 for moving the cutter head 25 in the Y direction, and a rotating means 28 for rotating the cutter head 25 about a rotational axis A extending in a Z direction which is perpendicular to the X and Y directions.

The cutter head 25 includes a cutter wheel 30, an air cylinder unit 33 made up of a piston rod 31 with the cutter wheel 30 attached thereto and a cylinder 32 so as to raise and lower the cutter wheel 30; a fine positioning mechanism 34 for finely adjusting the position of the cutter wheel 30 by finely adjusting the position of the cylinder 32; and a gripper 35 attached to a lower end of a shaft 61 which will be described later.

The air cylinder unit 33 raises or lowers the cutter wheel 30 by moving the piston rod 31 in the Z direction, and is adapted to apply a cutting force to the glass plate 3 by lowering the cutter wheel 30 at the timing of forming the main cut lines 16 and the edge cut lines 17.

The fine positioning mechanism 34 is made up of an X-direction slide 36 and a Y-direction slide 37. The X-direction slide 36 is fitted to the gripper 35 so as to be movable in the X direction, while the Y-direction slide 37 is fitted to the X-direction slide 36 so as to be movable in the Y direction, the cylinder 32 being fixed to the Y-direction slide 37. The X-direction slide 36 is movable in the X direction for adjustment relative to the gripper 35 by turning an adjustment screw 38. The Y-direction slide 37 is movable in the Y direction for adjustment relative to the X-direction slide 36 by turning an adjustment screw 39.

As the X-direction slide 36 and the Y-direction slide 37 are moved for adjustment by turning the respective adjustment screws 38 and 39, the fine positioning mechanism 34 is capable of adjusting the position of the cutter wheel 30 to the rotational axis A about which the cutter head 25 rotates and of offsetting the position of the cutter wheel 30 from the position of the rotational axis A. As a result, the fine adjustment of the cutting path becomes possible. In other words, the cutting path can be enlarged or reduced. In the case where the main cut line 16 or the edge cut line 17 is formed on the glass plate 3, the position of the cutter wheel 30 is moved for adjustment so that the cutter wheel 30 passes through the rotational axis A.

The X-direction moving device 26 includes an upper frame 43 mounted on a frame 41 at one end, as viewed in the X direction, of the base 21 and on a frame 41a at the other end, as viewed in the X direction, of the base 21 in such a manner as to extend in the X direction; an electric motor 44 mounted on the upper frame 43; a screw shaft 49 which is rotatably supported at its both ends on the upper frame 43 by means of a bearing 45 and has one end coupled to an output rotating shaft of the electric motor 44 by means of a pulley 46, a belt 47 and a pulley 48 and which extends in the X direction; a pair of parallel rails 50 mounted on the upper frame 43 and extending in the X direction; and a slider 51 which is fitted to the rails 50 so as to be movable in the X direction and to which a nut (not shown) threadedly engaged with the screw shaft 49 is secured. The shaft 61 is rotatably fitted to the slider 51 by means of a bearing 60 which will be described later. To prevent the upper frame 43 from becoming deflected due to its own weight, the upper frame 43 is mounted on a frame 41b provided on the base 21 between the frames 41 and 41a, so as to be movable in the Y direction by means of a rail 57b, a slider 58b, and a movable base 59b which extend in the Y direction. As the electric motor 44 is operated, the rotation of its output rotating shaft rotates the screw shaft 49 by means of the pulley 46, the belt 47, and the pulley 48, and the rotation of the screw shaft 49 moves in the X direction the slider 51 to which the nut threadedly engaged with the screw shaft 49 is secured. As a result, the cutter head 25, which is attached to the shaft 61 supported rotatably on the slider 51, is moved in the X direction.

The Y-direction moving device 27 includes an electric motor 54 mounted on the frame 41; a screw shaft 56 which is coupled to an output rotating shaft of the electric motor 54 and is rotatably supported at its both ends on the frame 41 by means of a bearing 55 in such a manner as to extend in the Y direction; a rail 57 mounted on the frame 41 and extending in the Y direction; a slider 58 which is fitted to the rail 57 and is movable in the Y direction; a nut (not shown) threadedly engaged with the screw shaft 56; a movable base 59 to which this nut and the slider 58 are secured and which is movable in the Y direction; an electric motor 54a mounted on the frame 41a; a screw shaft 56a which is coupled to an output rotating shaft of the electric motor 54a and is rotatably supported at its both ends on the frame 41a by means of a bearing 55a in such a manner as to extend in the Y direction; a rail 57a mounted on the frame 41a and extending in the Y direction; a slider 58a which is fitted to the rail 57a and is movable in the Y direction; a nut (not shown) threadedly engaged with the screw shaft 56a; and a movable base 59a to which this nut and the slider 58a are secured and which is movable in the Y direction. The movable base 59 is provided at one end of the upper frame 43, while the movable base 59a is provided at the other end of the upper frame 43. Through the synchronous operation of the electric motors 54 and 54a, the rotation of their output rotating shafts rotates the screw shafts 56 and 56a, and the rotation of the screw shafts 56 and 56a synchronously move in the Y direction the movable bases 59 and 59a to which the respective nuts and the sliders 58 and 58a are secured. Hence, the cutter head 25 is moved in the Y direction by means of the upper frame 43 mounted on the movable bases 59 and 59a.

The rotating means 28 includes the bearing 60 secured to the slider 51 of the X-direction moving device 26; the shaft 61 held by the bearing 60 and extending in the X direction; a bevel gear 62 attached to an upper end of the shaft 61; a bevel gear 63 meshing with the bevel gear 62; a line shaft 64 to which the bevel gear 63 is attached and which is rotatably supported by the slider 51 in such a manner as to extend in the X direction; and an electric motor 66 coupled to the line shaft 64 by means of a pulley, a belt, and the like 65 and secured to the slider 51. Since the gripper 35 of the cutter head 25 is attached to a lower end of the shaft 61, the cutter head 25 is held in a suspended manner. Through the operation of the electric motor 66, the rotation of its output rotating shaft rotates the line shaft 64 by means of the pulley, the belt, and the like 65, and the rotation of the line shaft 64 rotates the shaft 61 about the rotational axis A by means of the bevel gears 62 and 63. Consequently, the cutter head 25 attached to the shaft 61 is rotated about the rotational axis A.

The supporting devices 19 and 19a in this embodiment are formed in a mutually similar manner, and the supporting device 19 supports a half area of the glass plate 3, while the supporting device 19a similarly supports the remaining half area of the glass plate 3. Accordingly, a description will be given hereafter of the supporting device 19, and as for the supporting device 19a, a reference character 'a' will be added to the reference numerals of its component parts, as required, and a description thereof will be omitted.

Figure 9:
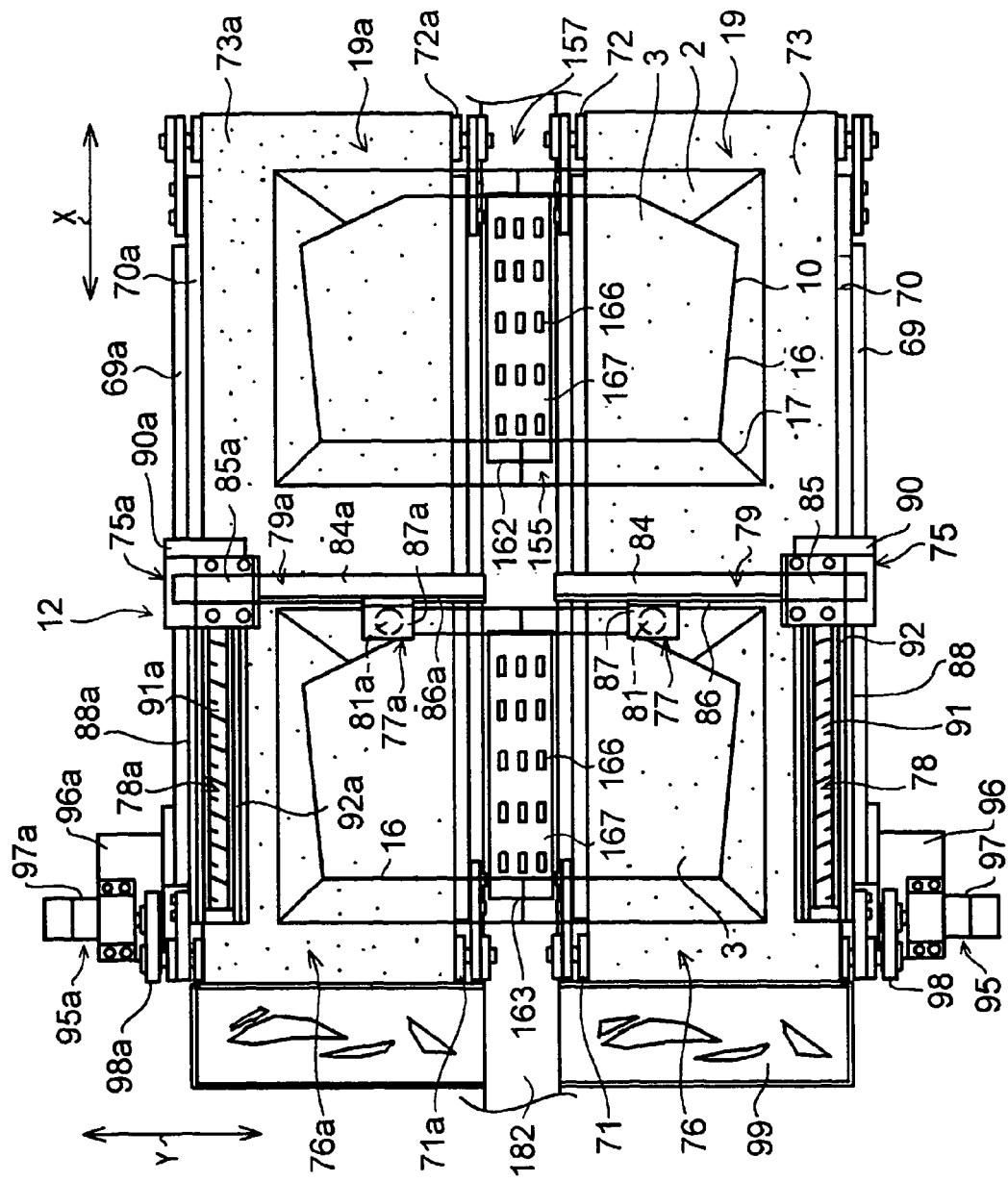
FIG. 9 is an enlarged explanatory view of mainly supporting devices of a cutting device and a bend-breaking device of the embodiment shown in FIG. 1.

Referring to FIG. 9, the supporting device 19 includes a supporting plate 70 supported on the base 21 by means of brackets 68 and columns 69; a drum 71 which is rotatably attached to one end, as viewed in the X direction, of the supporting plate 70; a drum 72 which is rotatably attached to the other end, as viewed in the X direction, of the supporting plate 70; and a flexible endless belt 73 wound around and trained between the drums 71 and 72. The glass plate 3 is placed on the endless belt 73. A plurality of holes (not shown) are provided in the supporting plate 70 and the endless belt 73, respectively. As a vacuum suction pump (not shown) connected to the plurality of holes in the supporting plate 70 through the piping and valves is operated, the glass plate 3 placed on the endless belt 73 is sucked under a vacuum at its other surface 20 so as to be held.

The bend-breaking device 302 disposed in the bend-breaking section 12 includes bend-breaking means 75 and 75a for bend-breaking along the main cut lines 16 the glass plate 3 on which the main cut lines 16 and the edge cut lines 17 have been formed in the cutting section 11, as well as a pair of supporting devices 76 and 76a for supporting the glass plate 3 to be subjected to bend-breaking. The supporting devices 76 and 76a are disposed on the base 21 in such a manner as to oppose each other with the transporting means 4 placed therebetween in the Y direction.

The bend-breaking means 75 and 75a in this embodiment are formed in a mutually similar manner, while the supporting devices 76 and 76a are also formed in a mutually similar manner. The bend-breaking means 75 executes bend-breaking in a half area of the glass plate 3, while the bend-breaking means 75a likewise executes bend-breaking in a remaining half area of the glass plate 3. The supporting device 76 supports a half area of the glass plate 3, while the supporting device 76a likewise supports the remaining half area of the glass plate 3. Accordingly, a description will be given hereafter of the bend-breaking means 75 and the supporting device 76, and as for the bend-breaking means 75a and the supporting device 76a, a reference character 'a' will be added to the reference numerals of their component parts, as required, and a description thereof will be omitted.

The bend-breaking means 75 includes a bend-breaking head 77, an X-direction moving mechanism 78 for moving the bend-breaking head 77 in the X direction, and a Y-direction moving mechanism 79 for moving the bend-breaking head 77 in the Y direction.

Figure 5:
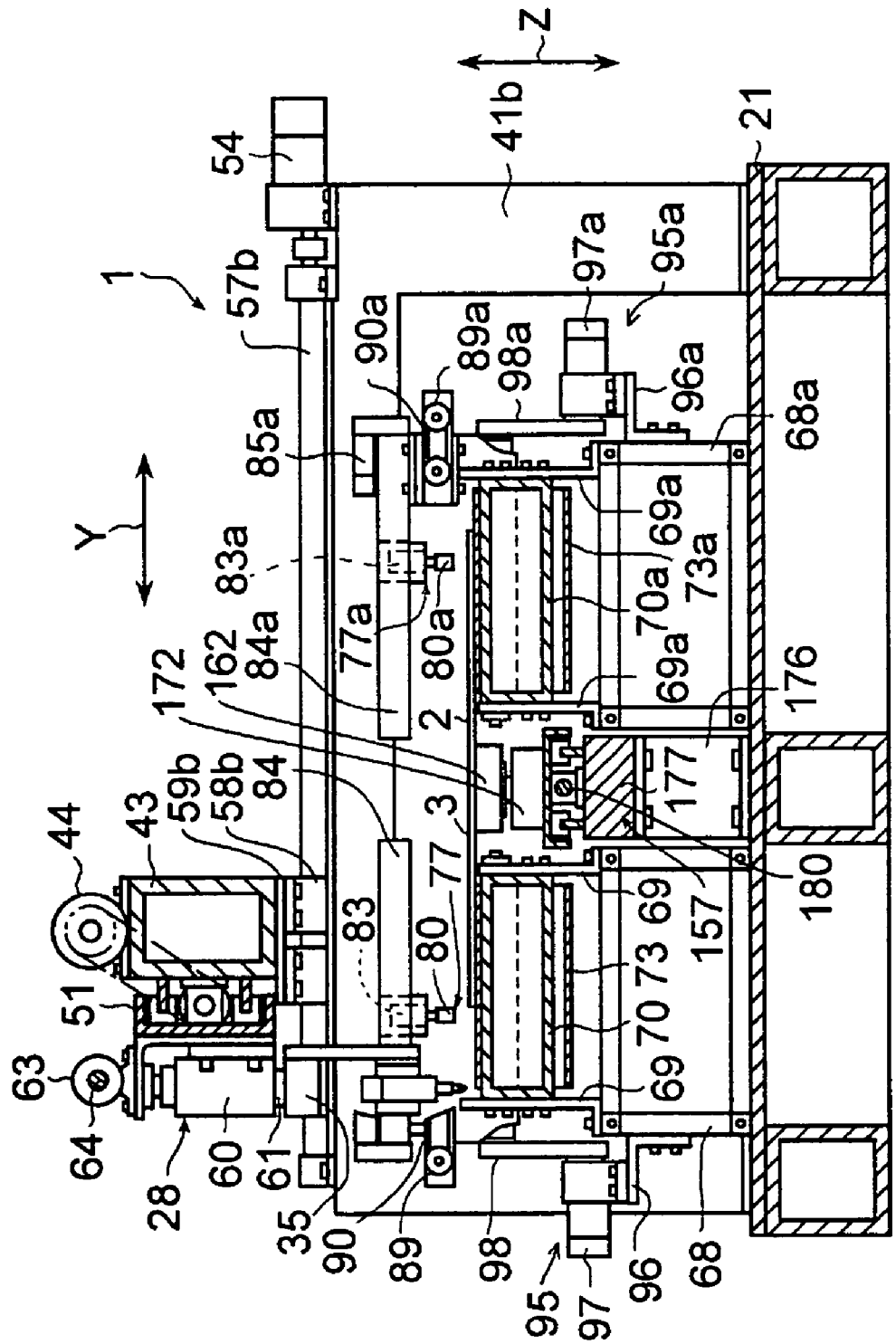
FIG. 5 is a cross-sectional view, taken along line V-V, of the embodiment shown in FIG. 1.
Figure 6:
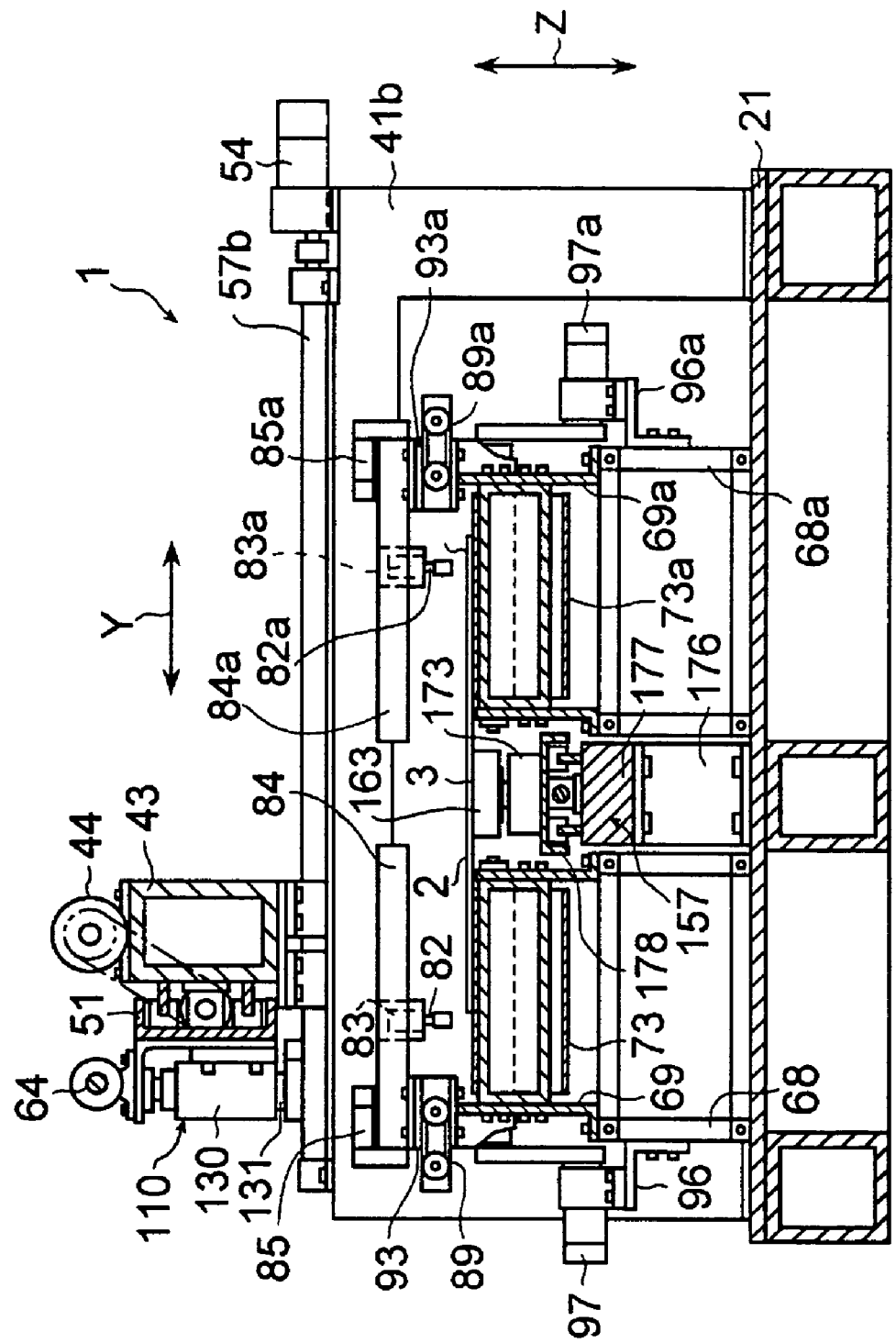
FIG. 6 is a cross-sectional view, taken along line VI-VI, of the embodiment shown in FIG. 1.

As shown in FIGS. 5 and 6, the bend-breaking head 77 has a push rod 80 and an air cylinder unit 81 for raising or lowering the push rod 80. The air cylinder unit 81 is constituted by a piston rod 82, which has one end to which the push rod 80 is attached, and a cylinder 83 attached to a slider 87 which will be described later. The bend-breaking head 77 is arranged such that as the air cylinder unit 81 is operated, the push rod 80 is lowered so as to cause the glass plate 3 supported on the supporting device 76 be pressed and bend-broken at its one surface 2 by the push rod 80.

As shown in FIG. 9, the Y-direction moving mechanism 79 includes an electric motor 85 fixed to a frame 84 extending in the Y direction; a screw shaft (not shown) connected to an output rotating shaft of the electric motor 85 at an end thereof and supported rotatably by the frame 84 and extending in the Y direction; a pair of parallel rails 86 mounted on the frame 84 and extending in the Y direction; and the slider 87 fitted to the pair of rails 86 so as to be movable in the Y direction. A nut (not shown) which is threadedly engaged with the screw shaft is secured to the slider 87, and the cylinder 83 is mounted on the slider 87. As the electric motor 85 is operated, the screw shaft having one end coupled to the an output rotating shaft of the electric motor 85 rotates, and the slider 87, to which the nut threadedly engaged with the screw shaft is secured, moves in the Y direction, thereby causing the bend-breaking head 77 mounted on the slider 87 to move in the Y direction.

As shown in FIGS. 6 and 9, the X-direction moving mechanism 78 includes an electric motor 89 fixed to a frame 88 extending in the X direction; a screw shaft 91 connected to an output rotating shaft of the electric motor 89 by means of a pulley, a belt, and the like 90 and supported rotatably by the frame 88 and extending in the X direction; a nut (not shown) which is threadedly engaged with the screw shaft 91; a pair of parallel rails 92 mounted on the frame 88 and extending in the X direction; and a slider 93 fitted to the pair of rails 92 so as to be movable in the X direction. The frame 88 is fixed to the column 69, the nut which is threadedly engaged with the screw shaft 91 is secured to the slider 93, and the frame 84 is mounted on the slider 93. As the electric motor 89 is operated, the screw shaft 91 having one end coupled to the an output rotating shaft of the electric motor 89 rotates, and the slider 93, to which the nut threadedly engaged with the screw shaft 91 is secured, moves in the X direction, thereby causing the frame 84 mounted on the slider 93 to move in the X direction. Thus, the bend-breaking head 77 moves in the X direction by means of the frame 84.

The supporting device 76 shares the supporting plate 70, the drum 71, the drum 72, and the endless belt 73 of the supporting device 19 in the cutting section 11, and the supporting device 76 has a traveling means 95 for causing the endless belt 73 to travel in the X direction. The traveling means 95 has an electric motor 97 mounted on the base 21 by means of brackets 68 and 96, and an output rotating shaft of the electric motor 97 is coupled to the drum 71 by means of a pulley, a belt, and the like 98. A cullet accommodating section 99 for accommodating the cullet (shown in FIG. 9) of the glass plate 3 bent-broken on the endless belt 73 is provided at a downstream end of the endless belt 73. The supporting device 76 is arranged such that, in order to accommodate in the cullet accommodating section 99 the cullet (shown in FIG. 9) of the glass plate 3 bent-broken on the endless belt 73 by the bend-breaking means 75, the drum 71 having one end coupled to the output rotating shaft of the electric motor 97 by means of the pulley, the belt, and the like 98 is rotated by the operation of the electric motor 97, the rotation of the drum 71 causes the endless belt 73 to travel in the X direction, and the traveling of the endless belt 73 moves the cullet to the downstream end of the endless belt 73, thereby accommodating the cullet in the cullet accommodating section 99.

It should be noted that although the supporting devices 19 and 76 are constructed by sharing the supporting plate 70, the drum 71, the drum 72, and the endless belt 73, in a case where the supporting devices 19 and 76 are constructed without sharing them, the supporting device 19, for example, may include the supporting plate 70, the drum 71, the drum 72, the endless belt 73, and the aforementioned traveling means 95, whereas the supporting device 76 may include a pair of tables (not shown) disposed on the base 21 by means of brackets in such a manner as to oppose each other in the Y direction as well as vacuum suction units (not shown) for sucking under a vacuum the glass plate 3 set on the tables so as to fix it. These vacuum suction units may be respectively connected to a vacuum suction pump (not shown) through the piping and valves, and may be adapted to suck the glass plate 3 under a vacuum by the operation of the vacuum suction pump.

A placing table device 310 disposed in the placing section 13 has a pair of placing tables 100 and 100a for temporarily placing the glass plate 3 transported from the bend-breaking section 12. The placing tables 100 and 100a are disposed on the base 21 in such a manner as to oppose each other with the transporting means 4 placed therebetween in the Y direction. As a result, even in a case where intervals between adjacent ones of suction units 161, 162, 163, 164, and 165 in the X direction are respectively made short, it is possible to provide the cullet accommodating section 99 at the downstream end of the endless belt 73. Namely, the glass-plate working apparatus 1 in accordance with this embodiment can be manufactured in a compact form, and can be installed in a limited space.

The placing tables 100 and 100a in this embodiment are formed in a mutually similar manner, and the placing table 100 supports a half area of the glass plate 3, while the placing table 100a similarly supports the remaining half area of the glass plate 3. Accordingly, a description will be given hereafter of the placing table 100, and as for the placing table 100a, a reference character 'a' will be added to the reference numerals of its component parts, as required, and a description thereof will be omitted.

Figure 3:
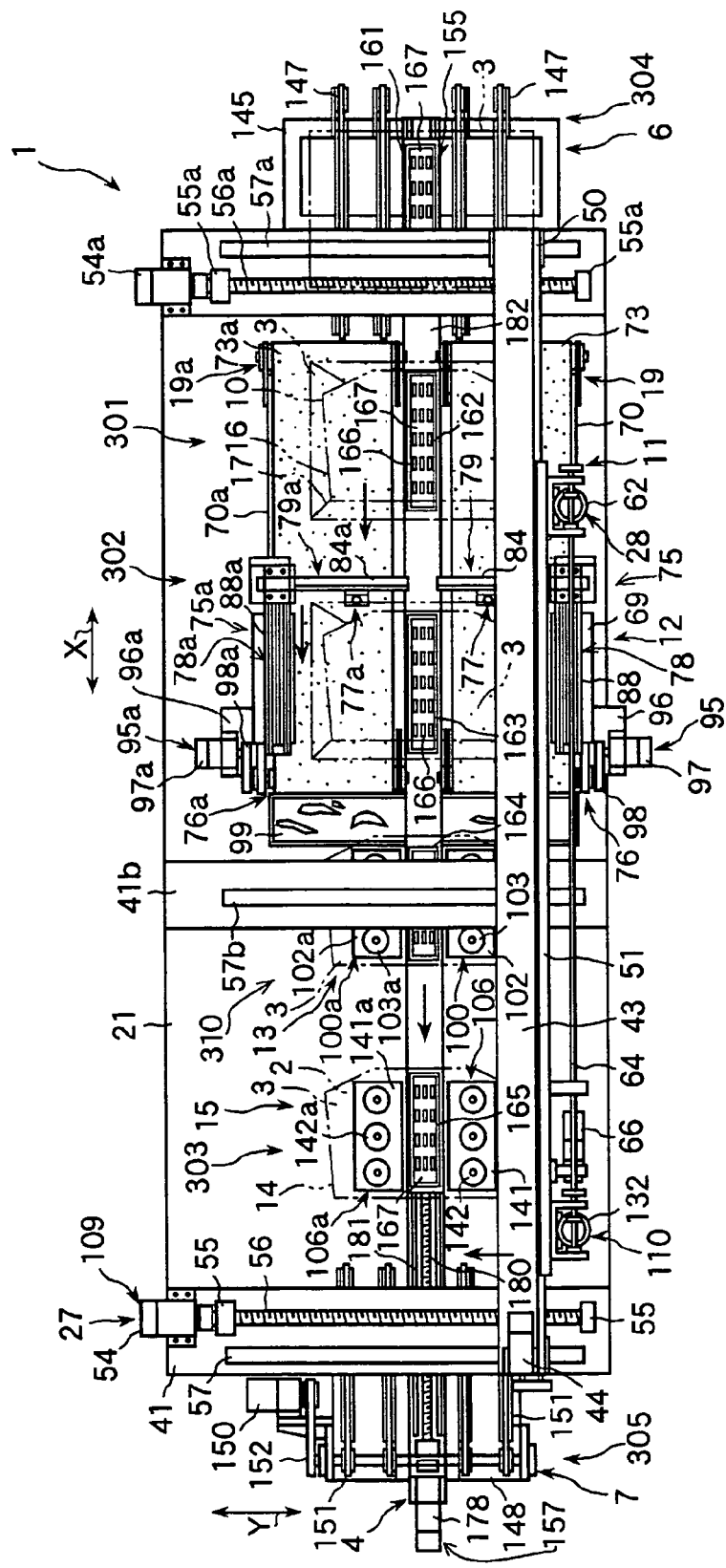
FIG. 3 is a plan view of the embodiment shown in FIG. 1.
Figure 4:
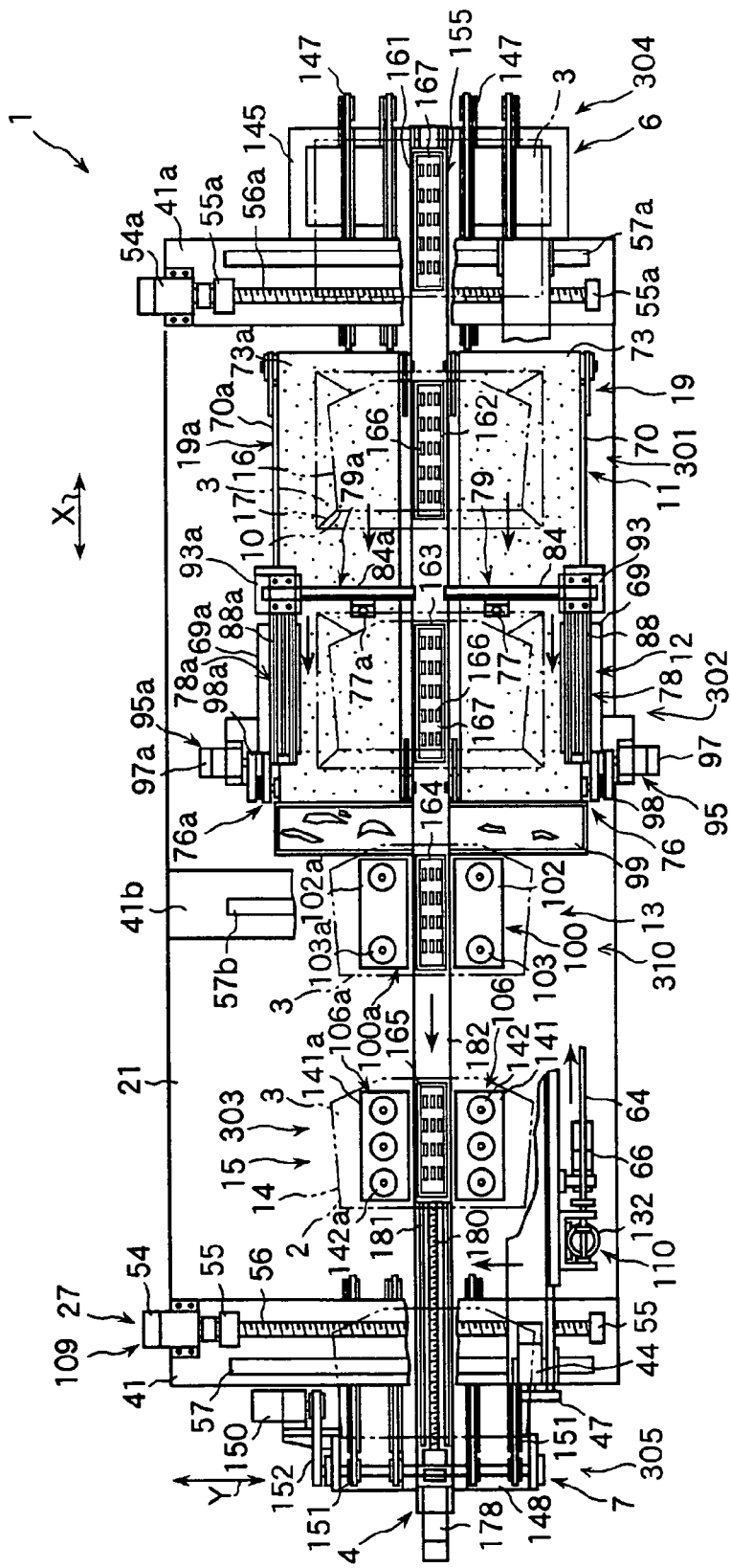
FIG. 4 is a partially cutaway plan view of the embodiment shown in FIG. 1.

As shown in FIGS. 1 and 3, the placing table 100 includes a table 102 disposed on the base 21 by means of a bracket 101 and a plurality of vacuum suction units 103 for vacuum-sucking the glass plate 3 set on the table 102 so as to hold it. The vacuum suction units are respectively connected to a vacuum suction pump (not shown) through the piping and valves, and are adapted to suck the glass plate 3 under a vacuum by the operation of the vacuum suction pump so as to hold it.

The grinding device 303 disposed in the grinding section 15 includes a grinding means 105 for grinding the peripheral edges 14 of the glass plate 3 bend-broken in the bend-breaking section 12 as well as a pair of supporting devices 106 and 106a for supporting the glass plate 3 subjected to bend-breaking. The pair of supporting devices 106 and 106a are disposed on the base 21 in such a manner as to oppose each other with the transporting means 4 placed therebetween in the Y direction.

Figure 10:
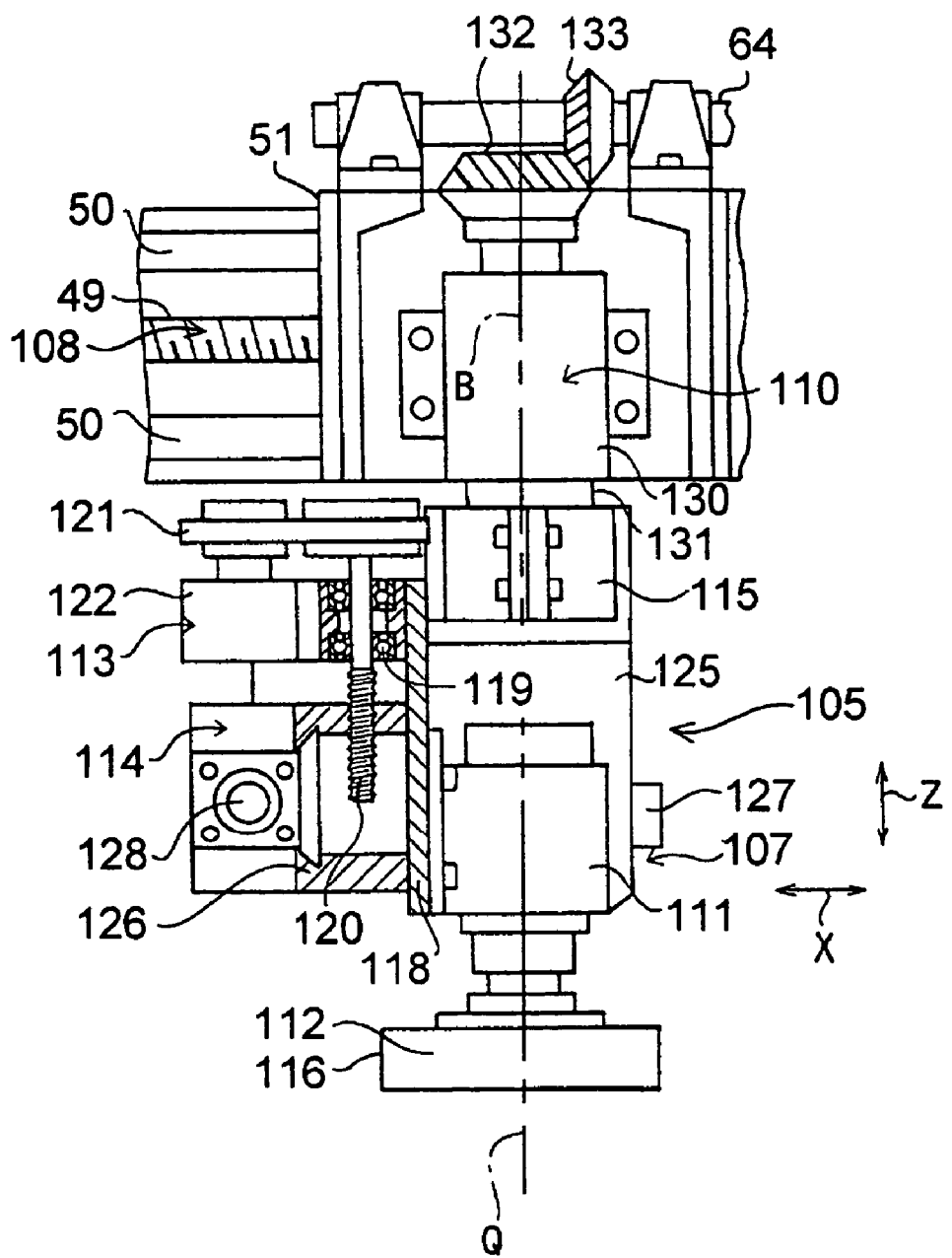
FIG. 10 is an enlarged explanatory view of mainly a grinding means of the embodiment shown in FIG. 1.

As shown in FIG. 10, the grinding means 105 includes a grinding head 107, an X-direction moving device 108 for moving the grinding head 107 in the X direction, a Y-direction moving device 109 for moving the grinding head 107 in the Y direction, and a rotating means 110 for rotating the grinding head 107 about a rotational axis B extending in the Z direction.

The grinding head 107 includes an electric motor 111; a grinding wheel 112 attached to one end of an output rotating shaft of the electric motor 111 so as to rotate by using the output rotating shaft as a rotational axis Q extending in the Z direction; a vertically moving means 113 for vertically moving the grinding wheel 112; a fine positioning mechanism 114 for finely adjusting the position of the grinding wheel 112 by finely adjusting the position of the electric motor 111; and a gripper 115 attached to a lower end of a shaft 131 which will be described later.

The grinding wheel 112 is arranged to grind the peripheral edges 14 of the glass plate 3 by its outer peripheral surface 116.

The vertically moving means 113 includes a Z-direction slide 118 on which the electric motor 111 is disposed so that the output rotating shaft of the electric motor 111 extends in the Z direction; a screw shaft 120 supported rotatably by the Z-direction slide 118 by means of a bearing 119 in such a manner as to extend in the Z direction; and an electric motor 122 coupled to the screw shaft 120 by means of a pulley, a belt, and the like 121. The Z-direction slide 118 is fitted to a Y-direction slide 126 so as to be movable in the Z direction, and the screw shaft 120 is threadedly engaged with the Y-direction slide 126. The vertically moving means 113 is so arranged that as the electric motor 111 is operated, the screw shaft 120 is rotated by means of the pulley, the belt, and the like 121, and this rotation moves the grinding wheel 112 in the Z direction by means of the Z-direction slide 118 and the electric motor 122 with respect to the Y-direction slide 126 threadedly engaged with the screw shaft 120.

The fine positioning mechanism 114 is made up of an X-direction slide 125 and the Y-direction slide 126. The X-direction slide 125 is fitted to the gripper 115 so as to be movable in the X direction, while the Y-direction slide 126 is fitted to the X-direction slide 125 so as to be movable in the Y direction and is fitted to the Z-direction slide 118 so as to be movable in the Z direction. The X-direction slide 125 is movable in the X direction for adjustment relative to the gripper 115 by turning an adjustment screw 127. The Y-direction slide 126 is movable in the Y direction for adjustment relative to the X-direction slide 125 by turning an adjustment screw 128.

As the X-direction slide 125 and the Y-direction slide 126 are moved for adjustment by turning the respective adjustment screws 127 and 128, the fine positioning mechanism 114 is capable of adjusting a grinding point (not shown) at which the outer peripheral surface 116 of the grinding wheel 112 grinds the peripheral edges 14 of the glass plate 3 to the rotational axis B about which the grinding head 107 rotates, and of offsetting the grinding point from the rotational axis B. As a result, the fine adjustment of the path of movement becomes possible. In other words, the path of movement can be enlarged or reduced. In the case where the peripheral edge 14 of the glass plate 3 is ground, the grinding wheel 112 is moved for adjustment so that the grinding point passes through the rotational axis B.

The X-direction moving device 108 shares the electric motor 44, the screw shaft 49, and the slider 51 of the X-direction moving device 26, and the shaft 131 is rotatably attached to the slider 51 by means of a bearing 130 which will be described later. As the electric motor 44 is operated, the rotation of its output rotating shaft rotates the screw shaft 49 by means of the pulley 46, the belt 47, and the pulley 48, and the rotation of the screw shaft 49 moves the slider 51, to which the nut threadedly engaged with the screw shaft 49 is secured, in the X direction. As a result, the grinding head 107 attached to the shaft 131 rotatably supported by the slider 51 is moved in the X direction.

The Y-direction moving device 109 shares the electric motors 54 and 54a, the screw shafts 56 and 56a, the sliders 58 and 58a, and the movable bases 59 and 59a of the Y-direction moving device 27. As the electric motors 54 and 54a are synchronously operated, the rotation of their output rotating shafts rotates the screw shafts 56 and 56a. The rotation of the screw shafts 56 and 56a, in turn, synchronously moves the movable bases 59 and 59a, to which the nuts and the sliders 58 and 58a are respectively secured, in the Y direction, thereby moving the grinding head 107 in the Y direction by means of the upper frame 43 mounted on the movable bases 59 and 59a.

The rotating means 110 shares the line shaft 64 and the electric motor 66 of the rotating means 28, and further includes the bearing 130 fixed to the slider 51 of the X-direction moving device 108, the shaft 131 held by the bearing 130 and extending in the Z direction, a bevel gear 132 attached to an upper end of the shaft 131, and a bevel gear 133 meshing with the bevel gear 132. The bevel gear 133 is attached to the line shaft 64. Since the gripper 115 of the grinding head 107 is attached to a lower end of the shaft 131, the grinding head 107 is held in a suspended manner. As the electric motor 66 is operated, the rotation of its output rotating shaft rotates the line shaft 64 by means of the pulley, the belt, and the like 65, and the rotation of the line shaft 64 rotates the shaft 131 about the rotational axis B by means of the bevel gears 132 and 133. As a result, the grinding head 107 attached to the shaft 131 is rotated about the rotational axis B.

The supporting devices 106 and 106a in this embodiment are formed in a mutually similar manner, and the supporting device 106 supports a half area of the glass plate 3, while the supporting device 106a similarly supports the remaining half area of the glass plate 3. Accordingly, a description will be given hereafter of the supporting device 106, and as for the supporting device 106a, a reference character 'a' will be added to the reference numerals of its component parts, as required, and a description thereof will be omitted.

As shown in FIGS. 1 and 3, the supporting device 106 includes a table 141 disposed on the base 21 by means of a bracket 140 and a plurality of vacuum suction units 142 for vacuum-sucking the glass plate 3 set on the table 141 so as to hold it. The vacuum suction units 142 are respectively connected to a vacuum suction pump (not shown) through the piping and valves, and are adapted to suck the glass plate 3 under a vacuum by the operation of the vacuum suction pump so as to hold it.

It should be noted that the supporting devices 19, 76, and 106 and the placing table 100 are arranged in series in the X direction, and the same intervals are respectively provided between the cutting area of the supporting device 19 and the bend-breaking area of the supporting device 76 in the X direction, between the bend-breaking area of the supporting device 76 and the placing table 100 in the X direction, and between the placing table 100 and the supporting device 106 in the X direction.

A carrying-out table device 305 disposed in the carrying-out section 7 has a carrying-out table 148 disposed on the carrying-out side for carrying out the glass plate 3. The carrying-out table 148 includes an electric motor 150 supported by the carrying-out table 148, a driving-side drum (not shown) and a driven-side drum (not shown) supported rotatably by the carrying-out table 148, and a plurality of endless belts 151 trained between these drums. An output rotating shaft (not shown) of the electric motor 150 is connected to the driving-side drum by means of a pulley, a belt, and the like 152. As the electric motor 150 is operated, the rotation of its output rotating shaft causes the plurality of endless belts 151 trained between the driving-side drum and the driven-side drum to travel in the X direction by means of the pulley, the belt, and the like 152, so as to carry out the glass plate 3 placed on the plurality of endless belts 151.

Figure 11:
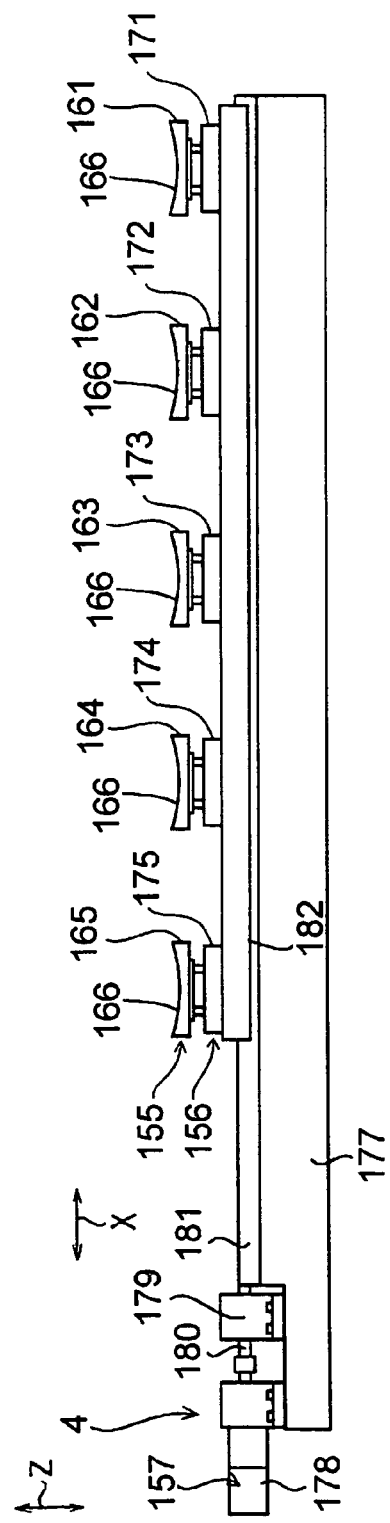
FIG. 11 is a front elevational explanatory view of a transporting means of the embodiment shown in FIG. 1.
Figure 12:
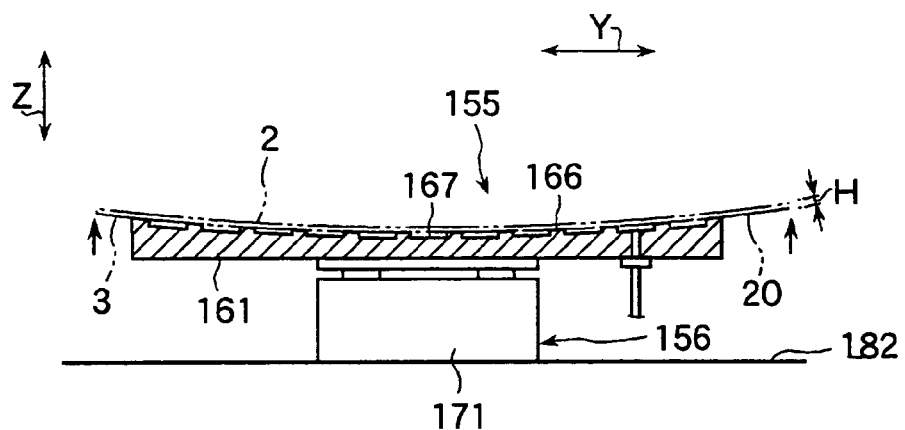
FIG. 12 is an explanatory view, partly in section, of mainly a suction means and a raising/lowering means of the embodiment shown in FIG. 1.

Referring to FIGS. 11 and 12, the transporting means 4 includes a suction means 155 for sucking the planar glass plate 3 and bending it into a concave shape, i.e., the form of projecting convexly in a downward direction (i.e., toward the base 21 in the Z direction) in the cross-sectional view in the X direction on a vacuum suction, and for canceling the suction of the glass plate 3 to have the glass plate 3 in a planar state as shown in FIGS. 1, 2, 5, 6 and 8, a raising/lowering means 156 for raising or lowering the glass plate 3 by means of the suction means 155, and a moving means 157 for moving the glass plate 3 in the X direction by means of the suction means 155 and the raising/lowering means 156.

The suction means 155 includes the suction unit 161 for causing the glass plate 3 placed on the carrying-in table 145 to be sucked from its other surface 20 under a vacuum; the suction unit 162 for causing the glass plate 3 placed on the endless belt 73 and cut by the cutting means 18 to be sucked from the other surface 20 under a vacuum; the suction unit 163 for causing the glass plate 3 placed on the endless belt 73 and bend-broken by the bend-breaking means 75 to be sucked from the other surface 20 under a vacuum; the suction unit 164 for causing the glass plate 3 placed on the placing table 100 to be sucked from the other surface 20 under a vacuum; and the suction unit 165 for causing the glass plate 3 ground by the grinding means 105 and supported by the supporting device 106 to be sucked from the other surface 20 under a vacuum. The suction units 161, 162, 163, 164, and 165 are arranged in series in the X direction and are disposed on the moving means 157 respectively at the same intervals by means of the raising/lowering means 156.

Figure 13:
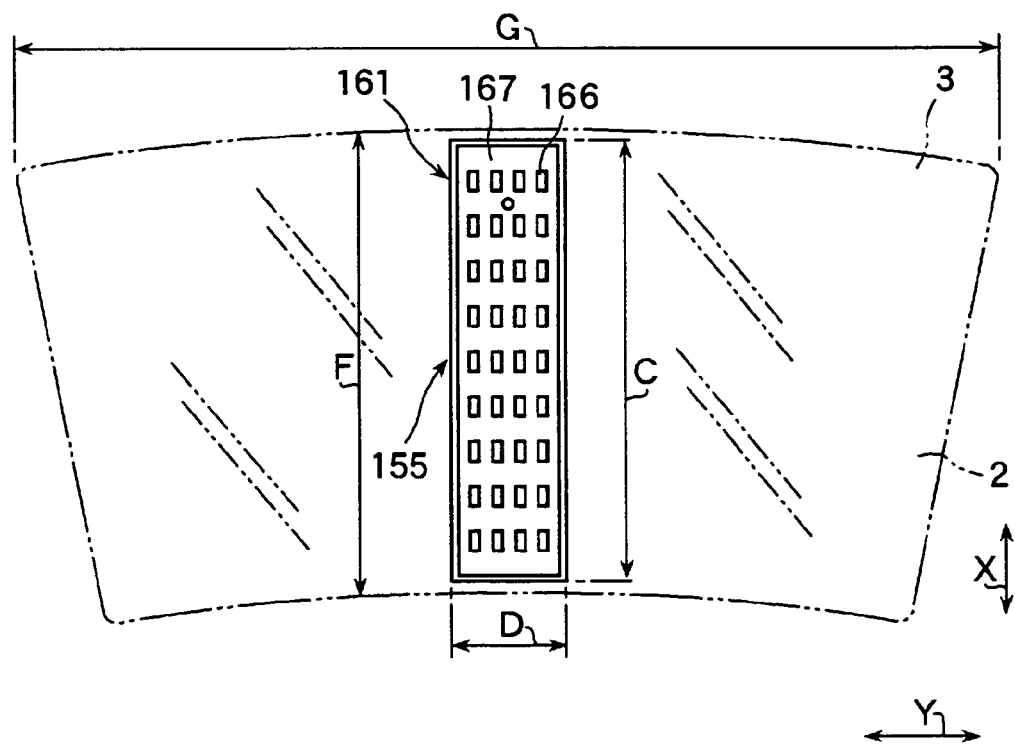
FIG. 13 is an explanatory plan view of mainly the suction means of the embodiment shown in FIG. 1.
Figure 14:
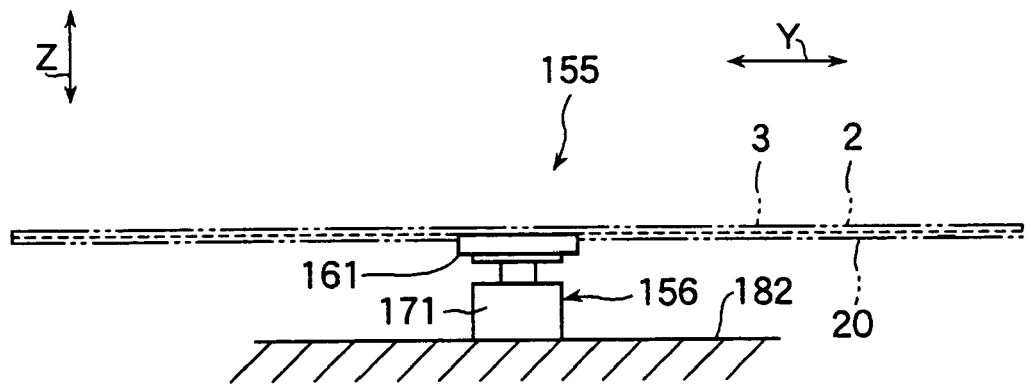
FIG. 14 is an explanatory view of mainly the suction means of the embodiment shown in FIG. 1.

Referring to FIGS. 12 and 13, the suction units 161, 162, 163, 164, and 165 respectively have recessed portions 167 formed by recessing portions of a holding surface 166 which is concave in the cross-sectional view in the X direction, so as to suck the glass plate 3 from its other surface 20 and hold it. These recessed portions 167 are constituted by grooves, or the like. The suction units 161, 162, 163, 164, and 165 have a common vacuum suction pump (not shown) connected to these recessed portions 167 through the piping and valves. As the vacuum suction pump is operated, the glass plate 3 is sucked under a vacuum. The length C in the X direction of the respective holding surfaces 166 of the suction units 161, 162, 163, 164, and 165 is formed to be longer than the width D thereof in the Y direction, and these holding surfaces 166 suck and hold the glass plate 3 such that its longitudinal direction coincides with the Y direction.

The smaller the thickness H of the glass plate 3 in the Z direction with respect to the width F of the glass plate 3 in the X direction and the length G thereof in the Y direction (particularly the longitudinal length of the glass plate 3), the greater the curvatures of the respective holding surfaces 166 of the suction units 161, 162, 163, 164, and 165. Namely, in the case where the thickness H of the glass plate 3 is small, and the width F and the length G are large, the curvature of the holding surface 166 is made large in advance, whereas in the case where the thickness H of the glass plate 3 is large, and the width F and the length G are small, the curvature of the holding surface 166 is made small in advance. For instance, in a case where the thickness H of the glass plate 3 used as windshield glass, rear glass, and the like of a general passenger car is in the neighborhood of 1.8 mm to 2.7 mm, the radii of curvature of the holding surfaces 166 of the suction units 161, 162, 163, 164, and 165 are preferably formed in the neighborhood of 4,000 mm to 1,000 mm. As the vacuum suction pump connected to the recessed portions 167 is operated, the respective glass plates 3 placed on the holding surfaces 166 of the suction units 161, 162, 163, 164, and 165 are sucked, and the bending moment due to the suction force is caused to occur in these glass plates 3. The glass plates 3 are thus bent so as to become concave in the cross-sectional view in the X direction, so that the section moduli of the geometrical moment of inertia of the glass plates 3 are made large. At the same time, these glass plates 3 are sucked and held by the respective holding surfaces 166 by means of this suction. Since the section moduli of the geometrical moment of inertia of the glass plates 3 are made large by causing the glass plates 3 to be bent so as to become concave in the cross-sectional view in the X direction, the suction units 161, 162, 163, 164, and 165 make it possible to suppress the deflection of the glass plates 3 on their longitudinal sides due to the self-weight of the glass plates 3 being transported. Hence, it becomes possible to prevent the occurrence of cracks in the glass plates 3 when they are raised or lowered, for example. Furthermore, it becomes possible to prevent the dislocation of the glass plates 3 from the holding surfaces 166 which hold them.

Figure 15:
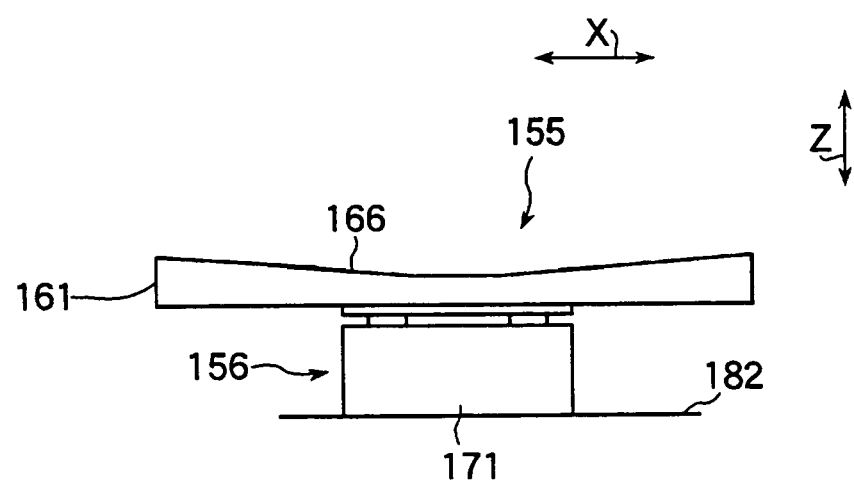
FIG. 15 is an explanatory view of mainly the suction means in a case where its holding surface is formed in a V-shape in the embodiment shown in FIG. 1.

It should be noted that the suction units 161, 162, 163, 164, and 165 may be adapted to bend the glass plates so that the glass plates become convex in the upward direction in the cross-sectional view in the X direction, and the suction units 161, 162, 163, 164, and 165 may have the recessed portions 167 formed by recessing the holding surfaces 166 which are convex in the cross-sectional view in the X direction, so as to suck the glass plates 3 from their one surfaces 2 or other surfaces 20 and hold them. Even if the holding surface 166 is formed flatly and is formed to be V-shaped in a cross-sectional view in the X direction as shown in FIG. 15, it is possible to suck the glass plate 3 and bend it in a concave shape in the cross-sectional view in the X direction. Namely, even if the holding surface 166 is not an accurately curved surface, it is possible to bend the glass plate 3 in a concave shape in the cross-sectional view in the X direction. Furthermore, the holding surface 166 may be formed discretely.

The raising/lowering means 156 has air cylinder units 171, 172, 173, 174, and 175, and the suction units 161, 162, 163, 164, and 165 are respectively attached to outer tips of their piston rods (not shown). Cylinders (not shown) of the air cylinder units 171, 172, 173, 174, and 175 are attached to a slider 182 which will be described later. As the air pressure of the air cylinder units 171, 172, 173, 174, and 175 is boosted, their piston rods are respectively moved in the Z direction, which in turn causes the suction units 161, 162, 163, 164, and 165 attached to the outer tips of these piston rods to be raised. On the other hand, as the air pressure of the air cylinder units 171, 172, 173, 174, and 175 is lowered, their piston rods are respectively moved in the Z direction, which in turn causes the suction units 161, 162, 163, 164, and 165 attached to the outer tips of these piston rods to be lowered.

The moving means 157 has a frame 177 mounted on the base 21 by means of brackets 176 and extending in the X direction; an electric motor 178 mounted at one end of the frame 177; a ball screw shaft 180 supported rotatably on the frame 177 by means of bearings 179 at its ends and extending in the X direction; a ball nut (not shown) threadedly engaged with the ball screw shaft 180; a pair of parallel rails 181 mounted on the frame 177 and extending in the X direction; and the slider 182 fitted to the pair of rails 181 in such a manner as to be movable in the X direction and extending in the X direction, the ball nut being secured to the slider 182. The frame 177 is provided between the supporting devices 19 and 19a, between the supporting devices 76 and 76a, between the placing tables 100 and 100a, and between the supporting devices 106 and 106a, and the cylinders of the air cylinder units 171, 172, 173, 174, and 175 are attached to the slider 182. As the electric motor 178 is operated, the rotation of its output rotating shaft rotates the ball screw shaft 180, and this rotation causes the slider 182, to which the ball nut threadedly engaged with the ball screw shaft 180 is secured, to move in the X direction. Consequently, the suction units 161, 162, 163, 164, and 165 are synchronously moved in the X direction by means of the air cylinder units 171, 172, 173, 174, and 175 attached to the slider 182.

The glass-plate working apparatus 1 in accordance with this embodiment is further comprised of a numerical controller (not shown) for numerically controlling the respective operation. This numerical controller is connected to the electric motors 44, 54, 54a, 66, 85, 89, 97, 111, 122, 150, and 178; the vacuum suction pump connected to the plurality of holes in the supporting plates 70 and 70a; the vacuum suction pump of the vacuum suction units 103, 103a, 104, and 104a; the vacuum suction pump of the suction units 161, 162, 163, 164, and 165; and the air cylinder units 171, 172, 173, 174, and 175. By controlling the rotation of the output rotating shafts, the suction force, and the air pressure, the numerical controller controls the above-described operation and the operation which will be described later.

In the case where the glass plate 3 having one surface 2 coated is worked by the glass-plate working apparatus 1 in accordance with this embodiment, the glass plate 3 to be worked is first placed in a planar state on the plurality of endless belts 147 on the carrying-in table 145 in the carrying-in section 6. Next, this glass plate 3 is sucked under a vacuum from its other surface 20 by the suction unit 161 and is thereby bent and held in a concave shape, and the glass plate 3 thus held is raised by the actuation of the air cylinder unit 171. Further, as the electric motor 178 of the moving means 157 is operated, the slider 182 is moved in the X direction to move the glass plate 3 in the X direction, the air cylinder unit 171 is actuated to lower the glass plate 3, and the vacuum suction by the suction unit 161 is canceled to have the glass plate 3 in a planar state as shown in FIGS. 1 and 5, and place the glass plate 3 on the cutting area on the endless belts 73 and 73a. The glass plate 3 is thus carried in from the carrying-in section 6 to the cutting section 11. Then, while the cutter head 25 is being rotated about the rotational axis A by the rotating means 28 such that the blade of the cutter wheel 30 is constantly held in a tangential direction with respect to the main cut line 16, the cutter wheel 30 is lowered by the air cylinder unit 33 to apply a cutting pressure to the glass plate 3, and the cutter head 25 is moved in the X and Y directions by the X-direction moving device 26 and the Y-direction moving device 27 so as to form predetermined main cut lines 16. Further, while the cutter head 25 is being rotated about the rotational axis A by the rotating means 28 such that the blade of the cutter wheel 30 is constantly held in a tangential direction with respect to the edge cut line 17, the cutter wheel 30 is lowered by the air cylinder unit 33 to apply a cutting pressure to the glass plate 3, and the cutter head 25 is moved in the X and Y directions by the synchronous operation of the X-direction moving device 26 and the Y-direction moving device 27 so as to form predetermined edge cut lines 17. The cutting means 18 in the cutting section 11 forms the edge cut lines 17 at least in the area of the glass plate 3 located between the supporting device 19 and 19a.

Next, the glass plate 3 on which the main cut lines 16 and the edge cut lines 17 have been formed is sucked under a vacuum from its other surface 20 by the suction unit 162 and is thereby bent and held in a concave shape, and the glass plate 3 thus held is raised by the actuation of the air cylinder unit 172. Further, as the electric motor 178 of the moving means 157 is operated, the slider 182 is moved in the X direction to move the glass plate 3 in the X direction, the air cylinder unit 172 is actuated to lower the glass plate 3, and the vacuum suction by the suction unit 163 is canceled to have the glass plate 3 in a planar state as shown in FIGS. 1 and 6 and place the glass plate 3 on the bend-breaking area on the endless belts 73 and 73a. The glass plate 3 is thus carried in from the cutting section 11 to the bend-breaking section 12. Then, as the push rod 80 is moved by the X-direction moving mechanism 78 and the Y-direction moving mechanism 79, and the push rod 80 is lowered by the air cylinder unit 81, the glass plate 3 is pressed from its one surface 2 so as to be bend-broken along the main cut lines 16.

Next, the bend-broken glass plate 3 is sucked under a vacuum from its other surface 20 by the suction unit 163 and is thereby bent and held in a concave shape, and the glass plate 3 thus held is raised by the actuation of the air cylinder unit 173. Further, as the electric motor 178 of the moving means 157 is operated, the slider 182 is moved in the X direction to move the glass plate 3 in the X direction, the air cylinder unit 173 is actuated to lower the glass plate 3, and the vacuum suction by the suction unit 163 is canceled to have the glass plate 3 in a planar state as shown in FIG. 1 and place the glass plate 3 on the placing tables 100 and 100a. The glass plate 3 is thus carried in from the bend-breaking section 12 to the placing section 13. Incidentally, while the bend-broken glass plate 3 has been raised by the air cylinder unit 173 of the transporting means 4, in order to accommodate in the cullet accommodating section 99 the cullet of the glass plate 3 which has been bend-broken by the bend-breaking means 75, the electric motor 97 is operated to cause the endless belt 73 to travel in the X direction by means of the drums 71 and 72, thereby allowing the cullet on the endless belt 73 to move to the downstream end of the endless belt 73 and to be accommodated in the cullet accommodating section 99.

Figure 7:
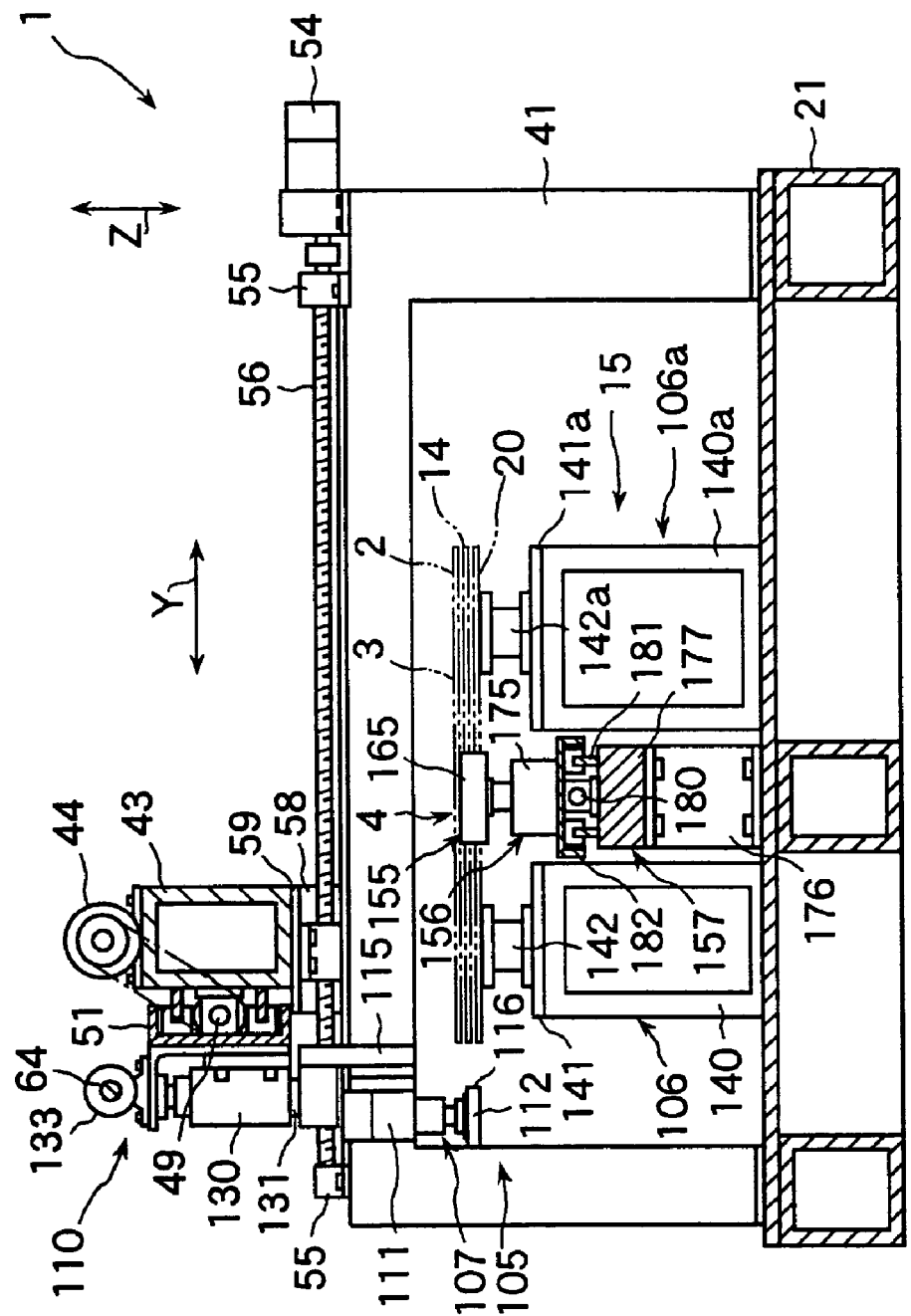
FIG. 7 is a cross-sectional view, taken along line VII-VII, of the embodiment shown in FIG. 1.

Next, the glass plate 3 which has been temporarily placed on the placing tables 100 and 100a is sucked under a vacuum from its other surface 20 by the suction unit 164 and is thereby bent and held in a concave shape, and the glass plate 3 thus held is raised by the actuation of the air cylinder unit 174. Further, as the electric motor 178 of the moving means 157 is operated, the slider 182 is moved in the X direction to move the glass plate 3 in the X direction, the air cylinder unit 174 is actuated to lower the glass plate 3, and the vacuum suction by the suction unit 164 is canceled to have the glass plate 3 in a planar state as shown in FIGS. 1 and 7, and place the glass plate 3 on the supporting devices 106 and 106a. The glass plate 3 is thus carried in from the placing section 13 to the grinding section 15. Next, as the electric motor 111 is operated, the grinding wheel 112 is rotated, while the grinding head 107 is being rotated by the rotating means 110 such that the grinding wheel 112 is constantly held at a predetermined angle with respect to the peripheral edge 14 of the glass plate 3 at the grinding point, the grinding head 107 is moved in the X and Y directions by the X-direction moving device 108 and the Y-direction moving device 109, thereby grinding the peripheral edges 14 of the glass plate 3.

Figure 2:
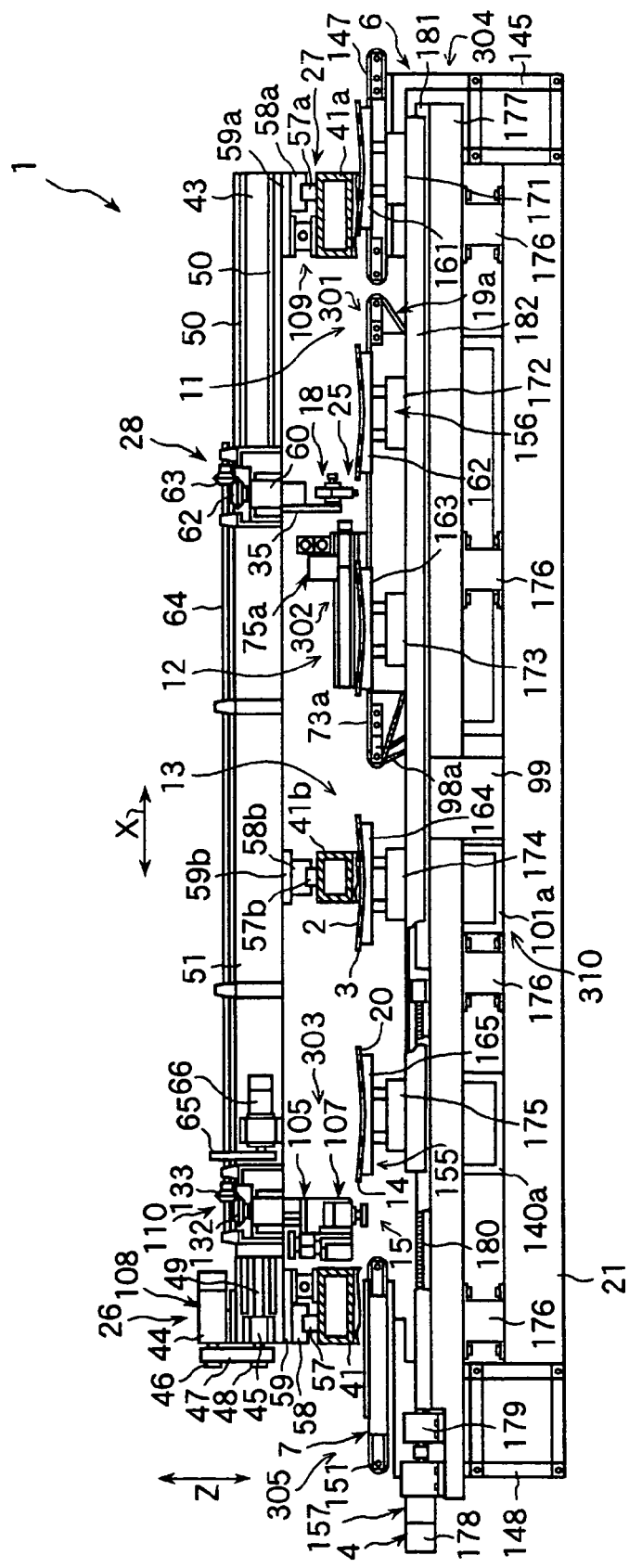
FIG. 2 is an explanatory partially cutaway front elevational view of the embodiment shown in FIG. 1.

Next, the glass plate 3 whose peripheral edges 14 have been ground is sucked under a vacuum from its other surface 20 by the suction unit 165 and is thereby bent and held in a concave shape, and the glass plate 3 thus held is raised by the actuation of the air cylinder unit 175. Further, as the electric motor 178 of the moving means 157 is operated, the slider 182 is moved in the X direction to move the glass plate 3 in the X direction, the air cylinder unit 175 is actuated to lower the glass plate 3, and the vacuum suction by the suction unit 165 is canceled to have the glass plate 3 in a planar state as shown in FIG. 2, and place the glass plate 3 on the plurality of endless belts 151 on the carrying-out table 148. The glass plate 3 is thus carried out from the grinding section 15 to the carrying-out section 7.

It should be noted that the above-described operation is performed continuously by the glass-plate working apparatus 1 in accordance with this embodiment, and the arrangement provided is such that the glass plates 3 are carried into the respective sections by the transporting means 4, and the glass plates 3 respectively subjected to working are carried out from the other sections in synchronism with the carrying-in.

Figure 16:
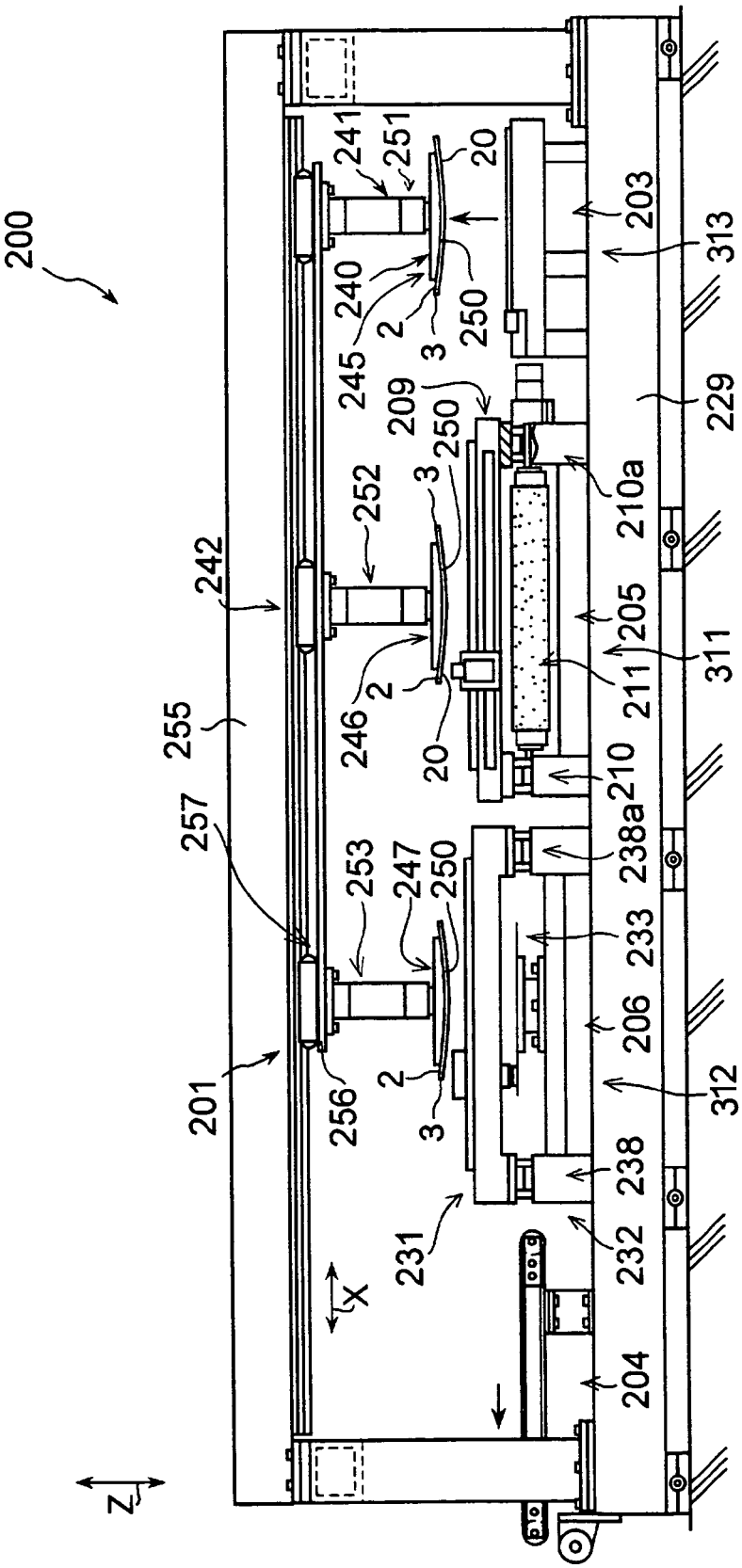
FIG. 16 is a front elevational view of a glass-plate working apparatus in accordance with another embodiment of the invention.
Figure 17:
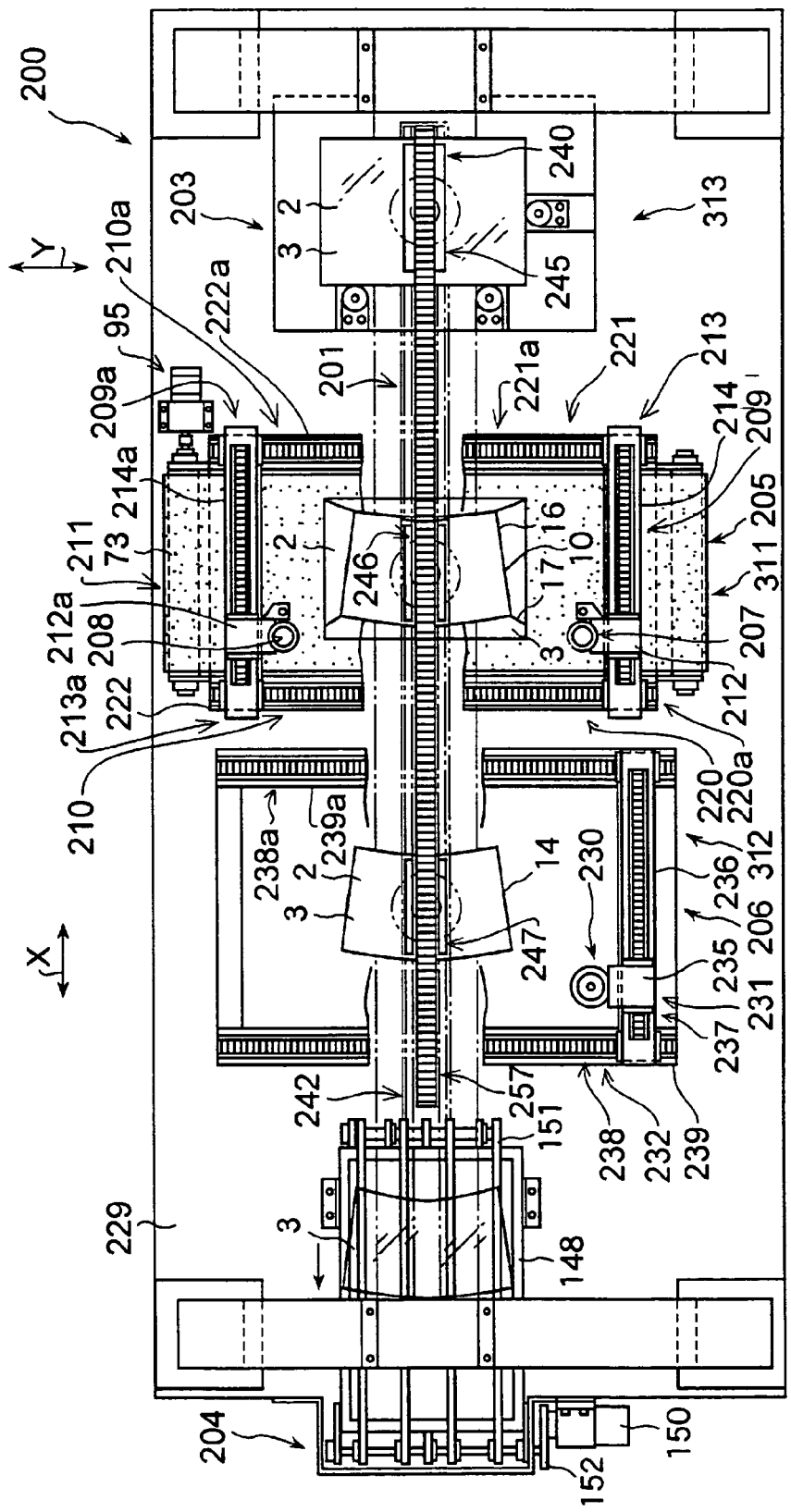
FIG. 17 is an explanatory plan view of the embodiment shown in FIG. 16.

In FIGS. 16 and 17, a glass-plate working apparatus 20 illustrating an embodiment different from the glass-plate working apparatus 1 in accordance with the above-described embodiment includes a transporting means 201 for transporting the glass plate 3 from a carrying-in section 203, where the glass plate 3 is bent in a concave shape in a cross-sectional view in the X direction and the cut lines 10 are formed, to a bend-breaking section 205 for bend-breaking along its cut lines 10 the glass plate 3 with the cut lines 10 formed thereon, for transporting the bend-broken glass plate 3 from the bend-breaking section 205 to a grinding section 206 for grinding the peripheral edges 14 of the bent-broken glass plate 3, and for transporting the ground glass plate 3 from the grinding section 206 to a carrying-out section 204; and a bend-breaking device 311 disposed in the bend-breaking section 205 and a grinding device 312 disposed in the grinding section 206, which are provided as working stations for working the glass plate 3.

A carrying-in-table device 313 disposed in the carrying-in section 203 includes a carrying-in table (not shown) disposed on the carrying-in side for carrying in the glass plate 3, and rollers (not shown) for positioning the glass plate 3 are arranged on an upper surface of the carrying-in table.

The bend-breaking device 311 disposed in the bend-breaking section 205 includes a pair of bend-breaking heads 207 and 208 for forming the main cut lines 16 and the edge cut lines 17 on the glass plate 3 from its one surface 2 and for bend-breaking the glass plate 3, on which the main cut lines 16 and the edge cut lines 17 have been formed, along the main cut lines 16 from its one surface 2; X-direction moving mechanisms 209 and 209a for respectively moving the bend-breaking heads 207 and 208 in the X direction; Y-direction moving mechanisms 210 and 210a for respectively moving the bend-breaking heads 207 and 208 in the Y direction; and a supporting device 211 for supporting the glass plate 3 to be subjected to bend-breaking.

The X-direction moving mechanism 209 has an electric linear motor means 213 adapted to move in the X direction a movable base 212 with the bend-breaking head 207 mounted thereon. The electric linear motor means 213 has a movable element (not shown) mounted on the movable base 212 as well as a stator (not shown) fixed on a frame 214 in such a manner as to extend in the X direction, and is adapted to move the movable base 212 in the X direction as a controlled current is supplied to the movable element. The frame 214 is provided with a pair of guide rails (not shown) extending in the X direction, and the movable base 212 which is slidably fitted to the guide rails is moved in the X direction while being guided by the guide rails.

The X-direction moving mechanism 209a has an electric linear motor means 213a adapted to move in the X direction a movable base 212a with the bend-breaking head 208 mounted thereon. The electric linear motor means 213a has a movable element (not shown) mounted on the movable base 212a as well as a stator (not shown) fixed on a frame 214a in such a manner as to extend in the X direction, and is adapted to move the movable base 212a in the X direction as a controlled current is supplied to the movable element. The frame 214a is provided with a pair of guide rails (not shown) extending in the X direction, and the movable base 212a which is slidably fitted to the guide rails is moved in the X direction while being guided by the guide rails.

The Y-direction moving mechanism 210 has a pair of electric linear motor means 220 and 221 provided respectively at both ends of the frame 214 to move the frame 214 in the Y direction. The pair of electric linear motor means 220 and 221 are arranged to be operated in synchronism with each other. The electric linear motor means 220 and 221 are constructed in a mutually similar manner, so that a description will be given hereafter of the electric linear motor means 220. The electric linear motor means 220 has a movable element (not shown) mounted on the lower surface of one end of the frame 214 as well as a stator (not shown) fixed on a frame 222 in such a manner as to extend in the Y direction. As a controlled current is supplied to the movable element, the electric linear motor means 220 moves the frame 214 in the Y direction and hence moves the bend-breaking head 207, which is mounted on the movable base 212, in the Y direction by means of the frame 214. The frame 222 is provided with a pair of guide rails (not shown) extending in the Y direction, and the frame 214 which is slidably fitted to the guide rails is moved in the Y direction while being guided by the guide rails. It should be noted that the stator is also used as a stator of a pair of electric linear motor means 220a and 221a of the Y-direction moving mechanism 210a.

The Y-direction moving mechanism 210a has the pair of electric linear motor means 220a and 221a provided respectively at both ends of the frame 214a to move the frame 214a in the Y direction. The pair of electric linear motor means 220a and 221a are arranged to be operated in synchronism with each other. The electric linear motor means 220a and 221a are constructed in a mutually similar manner, so that a description will be given hereafter of the electric linear motor means 220a. The electric linear motor means 220a shares the stator of the electric linear motor means 220 and has a movable element (not shown) mounted on the lower surface of one end of the frame 214a. As a controlled current is supplied to the movable element, the electric linear motor means 220a moves the frame 214a in the Y direction and hence moves the bend-breaking head 208, which is mounted on the movable base 212a, in the Y direction by means of the frame 214a. The frame 214a which is slidably fitted to the guide rails of the frame 222 is moved in the Y direction while being guided by the guide rails.

The supporting device 211 is constructed in the same way as the supporting device 76 of the glass-plate working apparatus 1, and its endless belt 73 is disposed on a base 229 so as to travel in the Y direction.

The grinding apparatus 312 disposed in the grinding section 206 including a grinding head 230 adapted to grind the peripheral edges 14 of the bend-broken glass plate 3 by its grinding wheel (not shown); an X-direction moving device 231 for moving the grinding head 230 in the X direction; a Y-direction moving device 232 for moving the grinding head 230 in the Y direction; and a supporting device 233 for supporting the glass plate 3 to be ground.

The X-direction moving device 231 has an electric linear motor means 237 having a movable element (not shown) attached to a movable base 235 with the grinding head 230 mounted thereon as well as a stator (not shown) fixed on a frame 236 in such a manner as to extend in the X direction. As a controlled current is supplied to the movable element, the electric linear motor means 237 moves the movable base 235 in the X direction and hence moves the grinding head 230, which is mounted on the movable base 235, in the X direction. The frame 236 is provided with a pair of guide rails (not shown) extending in the X direction, and the movable base 235 which is slidably fitted to the guide rails is moved in the X direction while being guided by the guide rails.

The Y-direction moving device 232 has a pair of electric linear motor means 238 and 238a provided respectively at both ends of the frame 236, and the pair of electric linear motor means 238 and 238a are arranged to be operated in synchronism with each other. The electric linear motor means 238 and 238a are constructed in a mutually similar manner, so that a description will be given hereafter of the electric linear motor means 238. The electric linear motor means 238 has a movable element (not shown) mounted on the lower surface of one end of the frame 236 as well as a stator (not shown) fixed on a frame 239 in such a manner as to extend in the Y direction. As a controlled current is supplied to the movable element, the electric linear motor means 238 moves the frame 236 in the Y direction and hence moves the grinding head 230, which is mounted on the movable base 235, in the Y direction by means of the frame 236. The frame 239 supported by the base 229 is provided with a pair of guide rails (not shown) extending in the Y direction, and the frame 236 which is slidably fitted to the guide rails is moved in the Y direction while being guided by the guide rails.

The supporting device 233 includes a table (not shown) disposed on the base 229 as well as a vacuum suction unit (not shown) installed on the table, and is adapted to suck the glass plate 3 from its other surface 20 by this vacuum suction unit.

Since the carrying-out table device (not shown) disposed in the carrying-out section 204 is constructed in the same way as the carrying-out table device 305 disposed in the carrying-out section 7 of the glass-plate working apparatus 1, a description of the carrying-out table device will be omitted.

The transporting means 201 includes a suction means 240 for sucking the glass plate 3 and bending it into the form of projecting convexly in a downward direction (i.e., toward the base 229 in the Z direction) in the cross-sectional view in the X direction, a raising/lowering means 241 for raising or lowering the glass plate 3 by means of the suction means 240, and a moving means 242 for moving the glass plate 3 in the X direction by means of the suction means 240 and the raising/lowering means 241.

The suction means 240 includes a suction unit 245 for sucking from the one surface 2 the glass plate 3 to be worked which is located in the carrying-in section 203 under a vacuum; a suction unit 246 for sucking from the one surface 2 the glass plate 3 to be ground in the bend-breaking section 205 under a vacuum; and a suction unit 247 for sucking from the one surface 2 the glass plate 3 to be carried out in the grinding section 206 under a vacuum. The suction units 245, 246, and 247 are arranged in series in the X direction and are disposed on the moving means 242 respectively at the same intervals by means of the raising/lowering means 241. The suction units 245, 246, and 247 have recessed portions (not shown) formed by recessing portions of a holding surface 250 which is convex in the cross-sectional view in the X direction, so as to suck the glass plate 3 from its other surface 20 and hold it. These recessed portions are constituted by grooves or the like. The suction units 245, 246, and 247 have a common vacuum suction pump (not shown) connected to these recessed portions through the piping and valves. As the vacuum suction pump is operated, the glass plate 3 is sucked under a vacuum.

The raising/lowering means 241 has air cylinder units 251, 252, and 253, and the suction units 245, 246, and 247 are respectively attached to outer tips of their piston rods (not shown) in a suspended manner. As the air cylinder units 251, 252, and 253 are actuated, the respective glass plates 3 are synchronously raised or lowered by means of the suction units 245, 246, and 247.

The moving means 242 includes a slider 256 attached to a lower surface of an upper frame 255 in such a manner as to be movable in the X direction as well as an electric linear motor means 257 made up of a stator (not shown) fixed on the upper frame 255 and extending in the X direction and a movable element (not shown) mounted on the upper surface of the slider 256. Cylinders of the air cylinder units 251, 252, and 253 are attached to the lower surface of the slider 256 at the same intervals in the X direction. As a controlled current is supplied to the movable element of the electric linear motor means 257, the slider 256 is moved in the X direction, and the respective glass plates 3 are synchronously moved in the X direction by means of the air cylinder units 251, 252, and 253 attached to the slider 256 as well as the suction units 245, 246, and 247.

In accordance with the invention, it is possible to provide a method of and an apparatus for working a glass plate in which deflection does not occur in the glass plate due to its own weight while the glass plate is being transported, and which does not cause cracking in the glass plate during, for instance, the raising or lowering of the glass plate.

What is claimed is:

1. A method of working a glass plate, comprising the steps of:

(a) disposing a planar glass plate in a first section;

(b) sucking and holding the planar glass plate at a holding surface having a concave shape or V-shape in cross-sectional view while disposed in said first section to bend the glass plate into a concave shape in cross-sectional view so as to suppress deflection of the glass plate due to its own weight;

(c) raising the held glass plate under suction;

(d) transporting the raised glass plate which is in the sucked and held state from the first section to a second section and then lowering the transported glass plate into a lowered position;

(e) canceling the suction of the lowered glass plate in the lowered position to have the glass plate in a planar state;

(f) working the planar glass plate in at least one of said first section and said second section; and (g) dimensioning said holding surface to have a length as measured in a transporting direction of the glass plate that is greater than a width of said holding surface as measured in a direction perpendicular to the transporting direction.

2. The method of working a glass plate according to claim 1, wherein one surface of the glass plate is coated.

3. The method of working a glass plate according to claim 1, wherein the step (b) includes applying a vacuum to the planar glass plate, whereby the glass plate becomes at least partly concave.

4. An apparatus for working a glass plate comprising:

a transport to transport a glass plate from a first section to a second section; and a working section to work the glass plate in a planar state, in at least one of said first section and said second section, the transport having a suction device including a holding surface having a concave shape or V-shape in cross-sectional view in a transporting direction, and to bend and hold at said holding surface the glass plate initially disposed in the planar state while in the first section into a concave shape in cross-section in a transporting direction so as to suppress deflection of the glass plate due to its over weight, wherein the suction device is configured to cancel the application of suction to the glass plate while transported to the second section to have the glass plate in a planar state, and raising/lowering structure to raise the glass plate which is in the sucked and held state in the first section, and to lower the glass plate transported to the second sections, said holding surface having a length as measured in the transporting direction of the glass plate that is greater than a width of the holding surface as measured in a direction perpendicular to the transporting direction.

5. The apparatus for working a glass plate according to claim 4, wherein said transport is adapted to carry the glass plate from the first section into the second section in synchronization with a carrying-out operation in which the worked glass plate is carried-out from the second section by said transport.

6. The apparatus for working a glass plate according to claim 4, wherein said transport is adapted to carry another glass plate into the first section in synchronization with a carrying-out operation in which the glass plate sucked is carried-out from the first section to the second section.

7. The apparatus for working a glass plate according to claim 4, wherein the suction device is adapted to suck the glass plate in a downwardly convex shape.

8. The apparatus for working a glass plate according to claim 7, wherein said suction device has a recessed portion for sucking one surface of the glass plate, said recessed portion being disposed in said holding surface.

9. The apparatus for working a glass plate according to claim 4, wherein one surface of the glass plate is coated.

10. A method of working a glass plate, comprising the steps of:

(a) disposing a planar glass plate in a first section;

(b) sucking and holding the planar glass plate at a holding surface having a concave shape or V-shape in a cross-sectional view while disposed in said first section to bend the glass plate into a concave shape in cross-sectional view so as to suppress deflection of the glass plate due to its own weight;

(c) raising the held glass plate under suction;

(d) transporting the raised glass plate which is in the sucked and held state from the first section to a second section and then lowering the transported glass plate into a lowered position;

(e) canceling the suction of the glass plate in the lowered position to allow the glass plate to assume a planar state;

(f) working the planar glass plate in at least one of said first section and said second section; and (g) dimensioning said holding surface being formed so as to be a longer length of the glass plate in a transporting direction of the glass plate than a width of the holding surface in a direction perpendicular to the transporting direction.

11. The method of working a glass plate according to claim 10, wherein after canceling of the suction, the glass plate is more planar as compared to when the glass plate is bent into said concave shape.

* * * * *

UNITED STATES PATENT AND TRADEMARK OFFICE
CERTIFICATE OF CORRECTION

| | |
|---|---|
| PATENT NO. | : 7,735,339 B2 |
| APPLICATION NO. | : 10/852128 |
| DATED | : June 15, 2010 |
| INVENTOR(S) | : Shigeru Bando |

It is certified that error appears in the above-identified patent and that said Letters Patent is hereby corrected as shown below:

Column 19, line 43 change "sections" to --section--.

Signed and Sealed this

Fourteenth Day of September, 2010

David J. Kappos
*Director of the United States Patent and Trademark Office*